(12) United States Patent
Ly et al.

(10) Patent No.: US 11,979,518 B2
(45) Date of Patent: May 7, 2024

(54) HANDLING CALLS ON A SHARED SPEECH-ENABLED DEVICE

(71) Applicant: GOOGLE LLC, Mountain View, CA (US)

(72) Inventors: Vinh Quoc Ly, Sunnyvale, CA (US); Raunaq Shah, San Francisco, CA (US); Okan Kolak, Sunnyvale, CA (US); Deniz Binay, Mountain View, CA (US); Tianyu Wang, Los Altos, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/115,441

(22) Filed: Feb. 28, 2023

(65) Prior Publication Data

US 2023/0208969 A1 Jun. 29, 2023

Related U.S. Application Data

(63) Continuation of application No. 17/393,536, filed on Aug. 4, 2021, now Pat. No. 11,622,038, which is a
(Continued)

(51) Int. Cl.
*H04M 3/00* (2006.01)
*G06F 3/16* (2006.01)
(Continued)

(52) U.S. Cl.
CPC ........ *H04M 3/42008* (2013.01); *G06F 3/167* (2013.01); *G10L 15/1822* (2013.01);
(Continued)

(58) Field of Classification Search
CPC .......... H04M 3/42008; H04L 61/4594; G10L 2015/223
(Continued)

(56) References Cited

U.S. PATENT DOCUMENTS

| 4,661,975 A | 4/1987 | Brecher |
| 4,870,686 A | 9/1989 | Gerson et al. |

(Continued)

FOREIGN PATENT DOCUMENTS

| CN | 1581294 | 2/2005 |
| CN | 101449569 | 6/2009 |

(Continued)

OTHER PUBLICATIONS

China National Intellectual Property Administration; Grant Notice issued in Application No. 201880016425.8; 5 pages; dated Jun. 29, 2023.
(Continued)

*Primary Examiner* — William J Deane, Jr.
(74) *Attorney, Agent, or Firm* — Gray Ice Higdon

(57) ABSTRACT

In some implementations, an utterance that requests a voice call is received, the utterance is classified as spoken by a particular known user, the particular known user is determined to be associated with a personal voice number, and in response to determining that the particular known user is associated with a personal voice number, the voice call is initiated with the personal voice number.

20 Claims, 12 Drawing Sheets

Related U.S. Application Data continuation of application No. 17/034,635, filed on Sep. 28, 2020, now Pat. No. 11,089,151, which is a continuation of application No. 15/980,805, filed on May 16, 2018, now Pat. No. 10,791,215.

(60) Provisional application No. 62/506,805, filed on May 16, 2017.

(51) Int. Cl.
| | |
|---|---|
| *G10L 15/18* | (2013.01) |
| *G10L 15/22* | (2006.01) |
| *G10L 15/30* | (2013.01) |
| *G10L 17/00* | (2013.01) |
| *H04L 61/4594* | (2022.01) |
| *H04L 65/1096* | (2022.01) |
| *H04M 3/42* | (2006.01) |

(52) U.S. Cl.
CPC .............. *G10L 15/22* (2013.01); *G10L 15/30* (2013.01); *G10L 17/00* (2013.01); *H04L 61/4594* (2022.05); *H04L 65/1096* (2013.01); *H04M 3/42059* (2013.01); *G10L 2015/223* (2013.01); *G10L 2015/225* (2013.01); *G10L 2015/227* (2013.01)

(58) Field of Classification Search
USPC ........... 379/201.01, 201.11, 207.12; 704/275
See application file for complete search history.

(56) References Cited

U.S. PATENT DOCUMENTS

| | | | |
|---|---|---|---|
| 4,945,570 | A | 7/1990 | Gerson et al. |
| 5,165,095 | A | 11/1992 | Borcherding |
| 5,483,579 | A | 1/1996 | Stogel |
| 5,483,586 | A | 1/1996 | Sussman |
| 5,864,603 | A | 1/1999 | Haavisto et al. |
| 6,167,117 | A | 12/2000 | Will |
| 6,885,990 | B1 | 4/2005 | Ohmori et al. |
| 7,015,049 | B2 | 3/2006 | Egger et al. |
| 7,746,994 | B1 | 6/2010 | Sanchez |
| 7,826,945 | B2 | 11/2010 | Zhang et al. |
| 7,831,431 | B2 | 11/2010 | Huang et al. |
| 8,804,933 | B2 | 8/2014 | Sanchez |
| 9,118,754 | B2 | 8/2015 | Nagel et al. |
| 9,231,645 | B2 | 1/2016 | Miwa |
| 9,286,910 | B1 | 3/2016 | Li et al. |
| 9,503,577 | B1 | 11/2016 | Sethumadhav |
| 9,529,793 | B1 | 12/2016 | Taubman et al. |
| 9,756,181 | B2 | 9/2017 | Bailey |
| 9,911,415 | B2 | 3/2018 | VanBlon et al. |
| 9,916,826 | B1 | 3/2018 | Slifka |
| 9,967,382 | B2 | 5/2018 | Hart et al. |
| 10,134,395 | B2 | 11/2018 | Typrin |
| 10,403,283 | B1 | 9/2019 | Schramm et al. |
| 10,506,088 | B1* | 12/2019 | Singh ............... H04M 1/27457 |
| 10,791,215 | B2 | 9/2020 | Ly et al. |
| 10,911,594 | B2 | 2/2021 | Ly et al. |
| 11,089,151 | B2 | 8/2021 | Ly et al. |
| 11,258,746 | B1 | 2/2022 | Nadig et al. |
| 2002/0065657 | A1 | 5/2002 | Reding |
| 2002/0090066 | A1 | 7/2002 | Gupta et al. |
| 2003/0103618 | A1 | 6/2003 | Brown |
| 2004/0010408 | A1 | 1/2004 | Mani |
| 2005/0256732 | A1 | 11/2005 | Bauer et al. |
| 2007/0299670 | A1* | 12/2007 | Chang ................... G08C 17/00 704/E15.04 |
| 2008/0247529 | A1* | 10/2008 | Barton .................. H04M 3/436 379/211.01 |
| 2009/0204409 | A1 | 8/2009 | Mozer |
| 2011/0026687 | A1 | 2/2011 | Smelyansky |
| 2012/0170722 | A1 | 7/2012 | Barton et al. |
| 2012/0316873 | A1 | 12/2012 | You |
| 2014/0297288 | A1 | 10/2014 | Yu et al. |
| 2014/0307858 | A1 | 10/2014 | Li |
| 2015/0030144 | A1 | 1/2015 | Barton et al. |
| 2015/0169336 | A1* | 6/2015 | Harper ............... G06Q 30/0277 715/706 |
| 2015/0178273 | A1 | 6/2015 | Hakkani-Tur et al. |
| 2015/0248884 | A1 | 9/2015 | Ljolje et al. |
| 2016/0063106 | A1 | 3/2016 | Chai et al. |
| 2016/0077794 | A1 | 3/2016 | Kim et al. |
| 2016/0140962 | A1 | 5/2016 | Sharifi |
| 2016/0269524 | A1 | 9/2016 | Stottlemyer |
| 2016/0323795 | A1 | 11/2016 | Braun |
| 2016/0351196 | A1 | 12/2016 | Fanty |
| 2016/0379637 | A1 | 12/2016 | Crook et al. |
| 2017/0374529 | A1 | 12/2017 | Walker |
| 2018/0025727 | A1 | 1/2018 | Kume et al. |
| 2018/0039696 | A1 | 2/2018 | Zhai et al. |
| 2018/0054504 | A1 | 2/2018 | Hart et al. |
| 2018/0054506 | A1 | 2/2018 | Hart et al. |
| 2018/0061402 | A1 | 3/2018 | Devaraj et al. |
| 2018/0218374 | A1 | 8/2018 | Shah et al. |
| 2018/0343233 | A1 | 11/2018 | Knudson et al. |
| 2019/0051309 | A1 | 2/2019 | Kim |
| 2019/0099653 | A1 | 4/2019 | Wanke et al. |
| 2019/0295552 | A1 | 9/2019 | Pasko et al. |
| 2021/0249016 | A1 | 8/2021 | Foerster |
| 2021/0368042 | A1 | 11/2021 | Ly et al. |

FOREIGN PATENT DOCUMENTS

| | | |
|---|---|---|
| CN | 105265005 | 1/2016 |
| EP | 0477688 | 4/1992 |
| JP | H02312426 | 12/1990 |
| JP | H06085893 | 3/1994 |
| JP | 2000324173 | 11/2000 |
| JP | 2003218996 | 7/2003 |
| JP | 2004350226 | 12/2004 |
| JP | 2017034386 | 2/2017 |
| WO | 2005027477 | 3/2005 |
| WO | 2008116296 | 10/2008 |
| WO | 2017197650 | 11/2017 |
| WO | 2018035461 | 2/2018 |

OTHER PUBLICATIONS

Korean Patent Office; Notice of Allowance issued in Application No. 10-2022-7036462; 6 pages; dated Jun. 28, 2023.
Japanese Patent Office; Office Action issue in Application No. 2021179423; 9 pages; dated Dec. 12, 2022.
China National Intellectual Property Administration; Office Action issued in Application No. 201880016425.8; 15 pages; dated Nov. 30, 2022.
Chang et al.; Temporary call-back telephone No. service; 2012 IEEE 26th International Conference on Advanced Information Networking and Applications; dated 2012.
The Korean Intellectual Property Office: Notice of Allowance issued in Application No. 10-2022-7015203, 3 pages, dated Jul. 21, 2022.
Korean Patent Office; Office Action issued in Application No. KR10-2022-7015203; 8 pages; dated May 18, 2022.
European Patent Office; Extended European Search Report issued in Application No. 21177634.9, 10 pages, dated Jan. 26, 2022.
Korean Intellectual Property Office; Notice of Allowance issued for Application No. 10-2021-7029035; 3 pages; dated Feb. 8, 2022.
The Korean Intellectual Property Office; Notice of Office Action issued in Application No. 10-2021-7029035; 10 pages; dated Nov. 26, 2021.
European Patent Office; Invitation pursuant to Rule 63(1) EPC issue in Application No. 21177634.9; 6 pages; dated Nov. 8, 2021.
Japanese Patent Office; Office Action issued in Application No. 2019-545937; 4 pages; dated Jul. 19, 2021.
Japanese Patent Office; Notice of Allowance issued in Application No. 2019-545937; 4 pages; dated Oct. 4, 2021.
Korean Patent Office; Notice of Allowance issued in Application No. 10-2021-7005692; 3 pages; dated Jun. 24, 2021.

(56) References Cited

OTHER PUBLICATIONS

Korean Patent Office; Office Action issued in Application No. 10-2021-7005692; 6 pages; dated May 10, 2021.
European Patent Office; Communication under Rule 71(3) EPC issue in Application No. 18730530.5; 65 pages; dated Feb. 5, 2021.
Japanese Patent Office; Office Action issue in Application No. 2019-545937; 9 pages; dated Jan. 4, 2021.
India Patent Office; Notice of Office Action issue in Application No. 201927036013; 6 pages; dated Jan. 14, 2021.
Korean Intellectual Property Office; Notice of Allowance issued for Application No. 10-2019-7024069; 3 pages; dated Nov. 30, 2020.
PCT International SEarch Report and Written Opinion issued in International Application No. PCT/US2018032873; 15 pages, dated Aug. 3, 2018.
PCT Written Opinion issued in International Application No. PCT/US2018032873; 8 pages; dated Mar. 27, 2019.
www.theverge.com [online] "Amazon Officially Unveils Touchscreen Echod Show," James Vincent, May 9, 2017, [retrieved on May 10, 2018] Retrieved from Internet: URL<https://www.theverge.com/circuitbreaker/2017/05/09/15590978/amazon-echo-show-touchscreen-price-release-date> 3 pages.
European Patent Office; Communication Pursuant to Article 94(3) issue in Application No. 18730530.5; dated May 15, 2020.
Korean Intellectual Property Office; Office Action issued for Application No. 10-2019-7024069 dated Jul. 27, 2020.
European Patent Office; Communication Pursuant to Article 94(3) issue in Application No. 21177634.9; 7 pages; dated Dec. 20, 2023.

\* cited by examiner

HANDLING CALLS ON A SHARED SPEECH-ENABLED DEVICE

FIELD

This specification generally relates to natural language processing.

BACKGROUND

Speech-enabled devices may perform actions in response to spoken utterances from users. For example, a user may say "OK Computer, will it rain today?" and a speech-enabled device may audibly respond, "It will be sunny all day." A benefit of using speech-enabled devices is that interacting with the speech-enabled devices may be generally hands-free. For example, when the user says a question, the speech-enabled device may provide an audible answer without needing the user to physically interact with anything using their hands. However, common speech-enabled devices are limited in the types of interactions supported.

SUMMARY

A speech-enabled device may be used to place a voice call. For example, John Doe may say "OK Computer, call (555) 555-5555" to have a speech-enabled device place a call to the phone number (555) 555-5555. Typically, outbound calls are associated with a caller number that can be used to identify the caller. For example, when John Doe calls (555) 555-5555 using his phone, a phone that receives the call may indicate that a call is coming from a phone number associated with John Doe's phone.

Associating caller numbers with a call may be useful, as a recipient of the call may use the caller number to decide whether to answer the call and also use the caller number if they need to place a call back. However, unlike a conventional phone, some speech-enabled devices may not be associated with a phone number that can be used as a caller number for a call.

To provide a caller number when placing a call, a speech-enabled device may attempt to use a personal voice number of the speaker as the caller number. A personal voice number may be a number used to place a call to a user. For example, when John says "OK Computer, call (555) 555-5555, a speech-enabled device may use the phone number (555) 999-9999 of John Doe's phone as the caller number. If the speech-enabled device is unable to determine a personal voice number of the speaker, the speech-enabled device may instead place the call anonymously so that the call is not associated with a voice number that can be used to place a call back. For example, such a call may indicate "Unknown Number" or "Private Number" as the caller number.

In some instances, if the call is to emergency services, the call may be placed using a temporary number that the recipient can use to call back the speech-enabled device. For example, such a call may indicate the phone number (555) 888-8888 that may be used for the next couple hours to place a call back to the speech-enabled device.

Additionally or alternatively, the speech-enabled device may use the identity of a speaker to determine a voice number to call. For example, when John says "OK Computer, call Dad," a speech-enabled device may recognize or otherwise authenticate John then access John's contact records to determine a phone number for "Dad." In another example, when Jane says "OK Computer, call Dad," a speech-enabled device may distinguish Jane from John by voice recognition or other authentication technique and thereafter access Jane's contact records to determine a phone number for "Dad." In yet another example, when a guest says "OK Computer, call Dad," a speech-enabled device will not recognize the guest by voice (or other authentication techniques) and may not access contact records of any user to determine a phone number for "Dad." Accordingly, as seen in these three examples, "OK Computer, call Dad" may have different results based on an identity of the speaker.

Additionally or alternatively, a speech-enabled device may respond to utterances from a user during a voice call placed by the speech-enabled device. For example, during a call the speech-enabled device may respond to commands of "OK Computer, hang up," "OK Computer, increase speaker volume," "OK Computer, what is the weather today." In responding to utterances during a voice call, the speech-enabled device may block at least a portion of the utterance from the recipient. For example, when a user says "OK Computer, increase speaker volume," the speech-enabled device may increase the speaker volume and block "increase speaker volume" so that the recipient only hears "OK Computer." In another example, the speech-enabled device may have a latency in providing audio to a recipient so may block an entire utterance from being heard by a recipient when the utterance starts with "OK Computer."

Accordingly, in some implementations an advantage may be that a speech-enabled device shared by multiple users may still enable a user to place a call and have the number that appears as the calling number on a telephone of a recipient to be a voice number of a mobile computing device of the user's. As people may typically not pick up calls from unrecognized numbers, this may increase the likelihood that a call placed using the speech-enabled device is answered. Additionally, calls may be more efficient as the person being called may already know who is calling based on the use of a voice number associated with the user. At the same time security may be provided in that a user may not use a voice number of any other user of the speech-enabled device as the speech-enabled device uses the voice number that matches the speech of the speaker.

Another advantage in some implementations may be that allowing use of contacts on a speech-enabled device may enable users to more quickly place calls as users may be able to quickly say names of contacts instead of say digits of a voice number. The speech-enabled device may also be able to disambiguate contacts between multiple users. For example, different users may have respective contact entries with the same name of "Mom" which are associated with different telephone numbers. Security may also be provided in that a user may not use contacts of other users of the speech-enabled device as the speech-enabled device may ensure that contacts used are those that match the speech of the speaker.

Yet another advantage in some implementations may be that allowing the handling of queries during a voice call may enable a better hands-free experience for a call. For example, a user may be able to virtually press digits in response to an automated attendant that requests callers respond with particular number presses. Security may also be provided in having two way holds be placed while a query is being handled and automatically ended once queries are resolved. Additionally, a two-way hold may ensure that the response to the query from the voice-enabled virtual assistant is not obscured by sounds from the other person. For example, without the two-way hold, the other person may speak at the same time as the response from the voice-enabled virtual assistant is output.

In some aspects, the subject matter described in this specification may be embodied in methods that may include the actions of receiving an utterance that requests a voice call, classifying the utterance as spoken by a particular known user, determining whether the particular known user is associated with a personal voice number, and in response to determining that the particular known user is associated with a personal voice number, initiating the voice call with the personal voice number.

In some implementations, classifying the utterance as spoken by a particular known user includes determining whether speech in the utterance matches speech corresponding to the particular known user. In certain implementations, classifying the utterance as spoken by a particular known user includes determining whether a visual image of at least a portion of the speaker matches visual information corresponding to the particular known user. In some implementations, determining whether the particular known user is associated with a personal voice number includes accessing account information of the particular known user and determining whether the account information of the user stores a voice number for the particular known user.

In certain implementations, determining whether the particular known user is associated with a personal voice number includes providing, to a server, an indication of the particular known user and a representation of the utterance and receiving, from the server, the personal voice number of the particular known user, a voice number to call, and an instruction to place a voice call. In some implementations, determining whether the particular known user is associated with a personal voice number includes accessing an account of the particular known user, determining whether the account of the user indicates a phone, and determining that the phone is connected with a speech-enabled device.

In certain implementations, initiating the voice call with the personal voice number includes initiating the voice call through the phone connected with the speech-enabled device. In some implementations, in response to determining that the particular known user is associated with a personal voice number, initiating the voice call with the personal voice number includes initiating the voice call through a Voice over Internet Protocol call provider.

In some aspects, the subject matter described in this specification may be embodied in methods that may include the actions of receiving an utterance that requests a voice call, classifying the utterance as spoken by a particular known user, in response to classifying the utterance as spoken by the particular known user, determining a recipient voice number to call based on contacts for the particular known user, and initiating the voice call to the recipient voice number.

In some implementations, in response to classifying the utterance as spoken by the particular known user, obtaining contact entries created by the particular known user includes in response to classifying the utterance as spoken by the particular known user, determining that contact entries of the particular known user are available, and in response to determining that contact entries of the particular known user are available, obtaining contact entries created by the particular known user. In certain implementations, in response to classifying the utterance as spoken by the particular known user, determining a recipient voice number to call based on voice contacts for the particular known user includes in response to classifying the utterance as spoken by the particular known user, obtaining contact entries created by the particular known user, identifying a particular contact entry from among the contact entries where the particular contact entry includes a name that matches the utterance, and determining a voice number indicated by the particular contact entry as the recipient voice number.

In some implementations, identifying a particular contact entry from among the contact entries where the particular contact entry includes a name that matches the utterance includes generating a transcription of the utterance and determining that the transcription includes the name. In certain implementations, classifying the utterance as spoken by a particular known user includes obtaining an indication that speech in the utterance was determined by a speech-enabled device to match speech corresponding to the particular known user. In some implementations, classifying the utterance as spoken by a particular known user includes determining whether speech in the utterance matches speech corresponding to the particular known user. In certain implementations, initiating the voice call to the recipient voice number includes providing, to a speech-enabled device, the recipient voice number and an instruction to initiate a voice call to the recipient voice number.

In some implementations, actions include receiving a second utterance that requests a second voice call, classifying the second utterance as not being spoken by any known user of a speech-enabled device, and in response to classifying the second utterance as not being spoken by any known user of the speech-enabled device, initiating a second voice call without accessing voice contacts for any known user of the speech-enabled device.

In some aspects, the subject matter described in this specification may be embodied in methods that may include the actions of determining that a first party has spoken a query for a voice-enabled virtual assistant during a voice call between the first party and a second party, in response to determining that the first party has spoken the query for the voice-enabled virtual assistant during the voice call between the first party and the second party, placing the voice call between the first party and the second party on hold, determining that the voice-enabled virtual assistant has resolved the query, and, in response to determining that the voice-enabled virtual assistant has handled the query, resuming the voice call between the first party and the second party from hold.

In some implementations, determining that a first party has spoken a query for a voice-enabled virtual assistant during a voice call between the first party and a second party includes determining, by a speech-enabled device, that a hotword was spoken by the first party during the voice call. In certain implementations, placing the voice call between the first party and the second party on hold includes providing an instruction to a voice call provider to place the voice call on hold. In some implementations, placing the voice call between the first party and the second party on hold includes routing audio from a microphone to the voice-enabled virtual assistant instead of a voice server and routing audio from the voice-enabled virtual assistant to a speaker instead of audio from the voice server.

In certain implementations, determining that the voice-enabled virtual assistant has resolved the query includes providing, to the voice-enabled virtual assistant, the query and an indication that a voice call is ongoing on the speech-enabled device and receiving, from the voice-enabled virtual assistant, a response to the query and an indication that the query is resolved. In some implementations, receiving, from the voice-enabled virtual assistant, a response to the query and an indication that the query is resolved includes receiving audio to be output as the response to the query and a binary flag with a value that indicates whether the query is resolved. In certain implementations, the voice-enabled virtual assistant is configured to identify a command corresponding to the query, determine that the command can be executed during a voice call, and in response to determining that the command can be executed during a voice call, determine the response to indicate an answer to the command.

In some implementations, the voice-enabled virtual assistant is configured to identify a command corresponding to the query, determine that the command cannot be executed during a voice call, and in response to determining that the command cannot be executed during a voice call, determine the response to indicate that the command cannot be executed. In certain implementations, determining that the command cannot be executed during a voice call includes obtaining a list of commands that can be executed normally during a voice call and determining that the command identified is not in the list of commands. In some implementations, determine that the command cannot be executed during a voice call includes obtaining a list of commands that cannot be executed normally during a voice call and determining that the command identified is in the list of commands.

In certain implementations, in response to determining that the voice-enabled virtual assistant has handled the query, resuming the voice call between the first party and the second party from hold includes providing an instruction to a voice call provider to resume the voice call from hold. In some implementations, in response to determining that the voice-enabled virtual assistant has handled the query, resuming the voice call between the first party and the second party from hold includes routing audio from a microphone to a voice server instead of the voice-enabled virtual assistant and routing audio from the voice server to a speaker instead of audio from the voice-enabled virtual assistant. In certain implementations, in response to determining that the voice-enabled virtual assistant has handled the query, resuming the voice call between the first party and the second party from hold includes receiving an instruction from the voice-enabled virtual assistant to produce dual-tone multi-frequency signals and in response to receiving an instruction from the voice-enabled virtual assistant to produce dual-tone multi-frequency signals, providing a second instruction to the voice call provider to produce the dual-tone multi-frequency signals after providing the instruction to the voice call provider to resume the voice call from hold. In some implementations, the voice-enabled assistant server is configured to determine that the query indicates a command to generate one or more dual-tone multi-frequency signals and one or more numbers corresponding to the one or more dual-tone multi-frequency signals.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

Details of one or more implementations of the subject matter described in this specification are set forth in the accompanying drawings and the description below. Other features, aspects, and potential advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

FIGS. 1A-1D are block diagrams that illustrate different example interactions in a system 100. The system 100 includes a speech-enabled device 125 that can be used by a user 110 to call a recipient 155 without having the user 110 physically interact with the system 100 by touch.

In some implementations, the speech-enabled device 125 may perform actions in response to detecting an utterance including a predetermined phrase, also referred to as a hotword, that a user speaks to address the speech-enabled device 125. For example, a hotword may be "OK Computer" or some other phrase, that a user must speak immediately preceding any request that the user says to the speech-enabled device 125.

To place calls with a caller number, the speech-enabled device 125 may classify utterances as spoken by particular known users, and place calls with caller numbers of the particular known users. A known user may be a user that is registered as a user of the system 100 and a guest user may be a user that is not registered as a user of the system 100. For example, "Mom" may register as a known user of the speech-enabled device 125, and the speech-enabled device 125 may later classify whether an utterance is spoken by the known user "Mom."

Figure 1A:
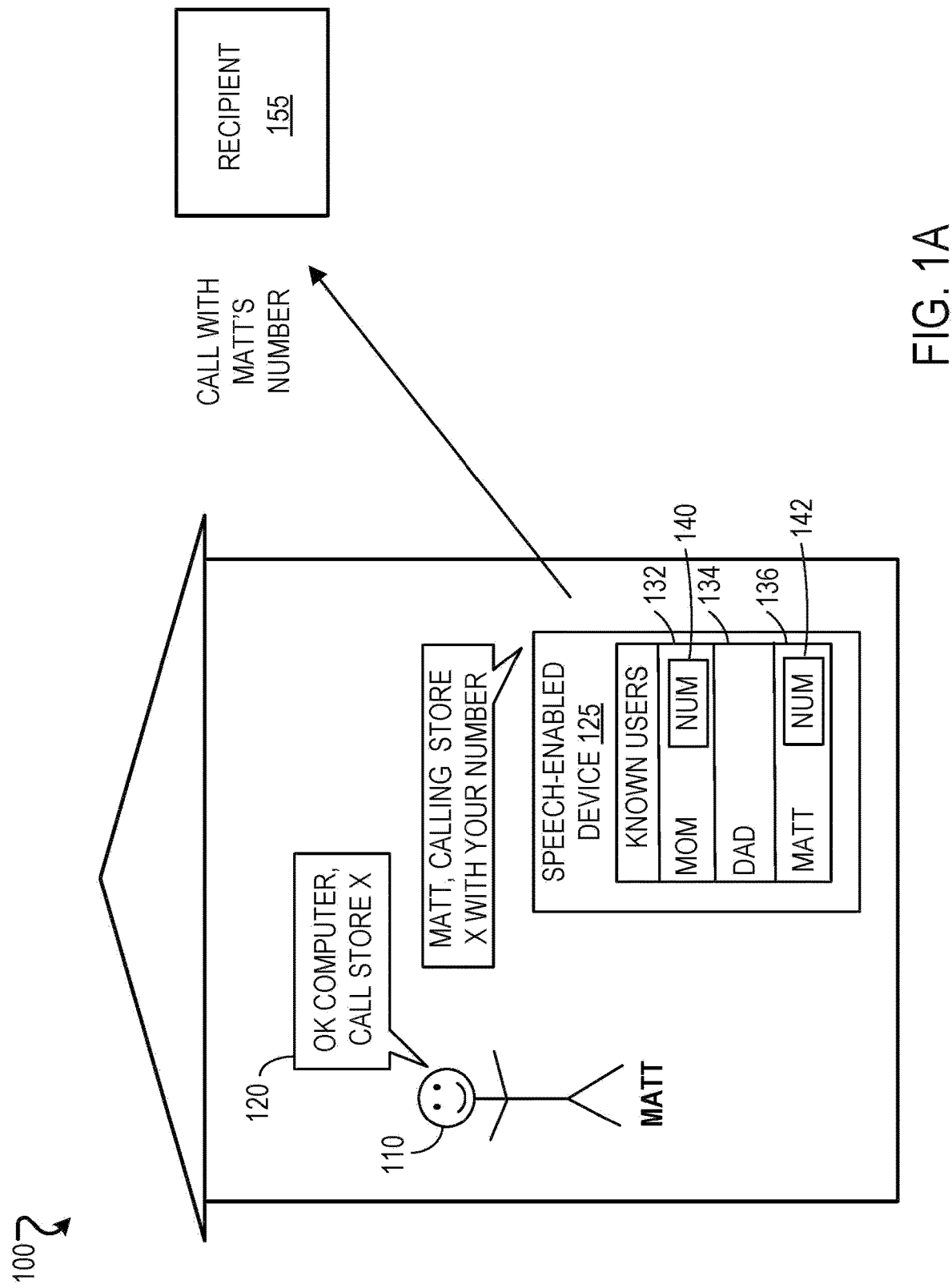
FIG. 1A, FIG. 1B, FIG. 1C, and FIG. 1D are block diagrams that illustrate example interactions with a speech-enabled device placing a call.
Figure 1B:
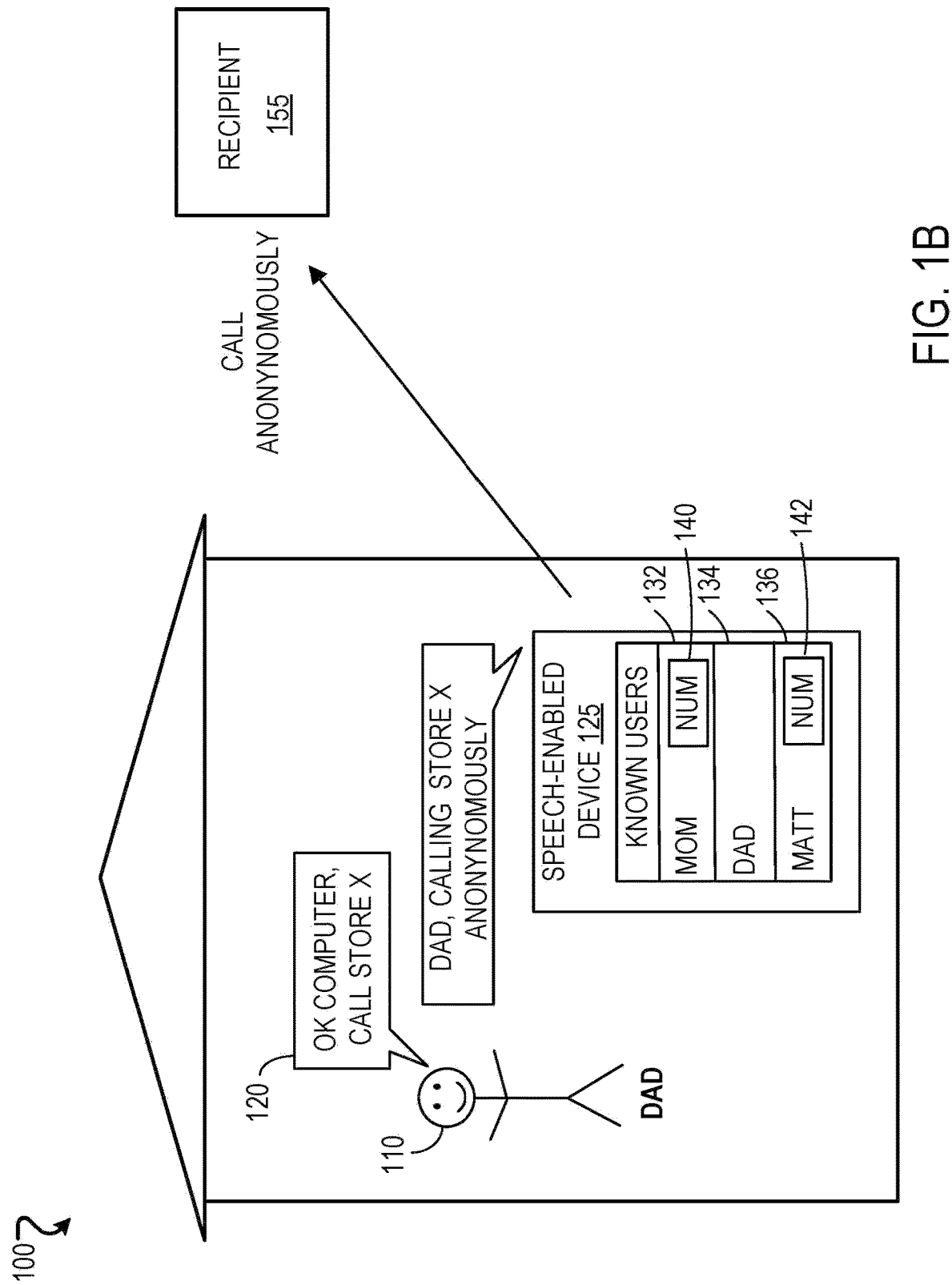
Figure 1C:
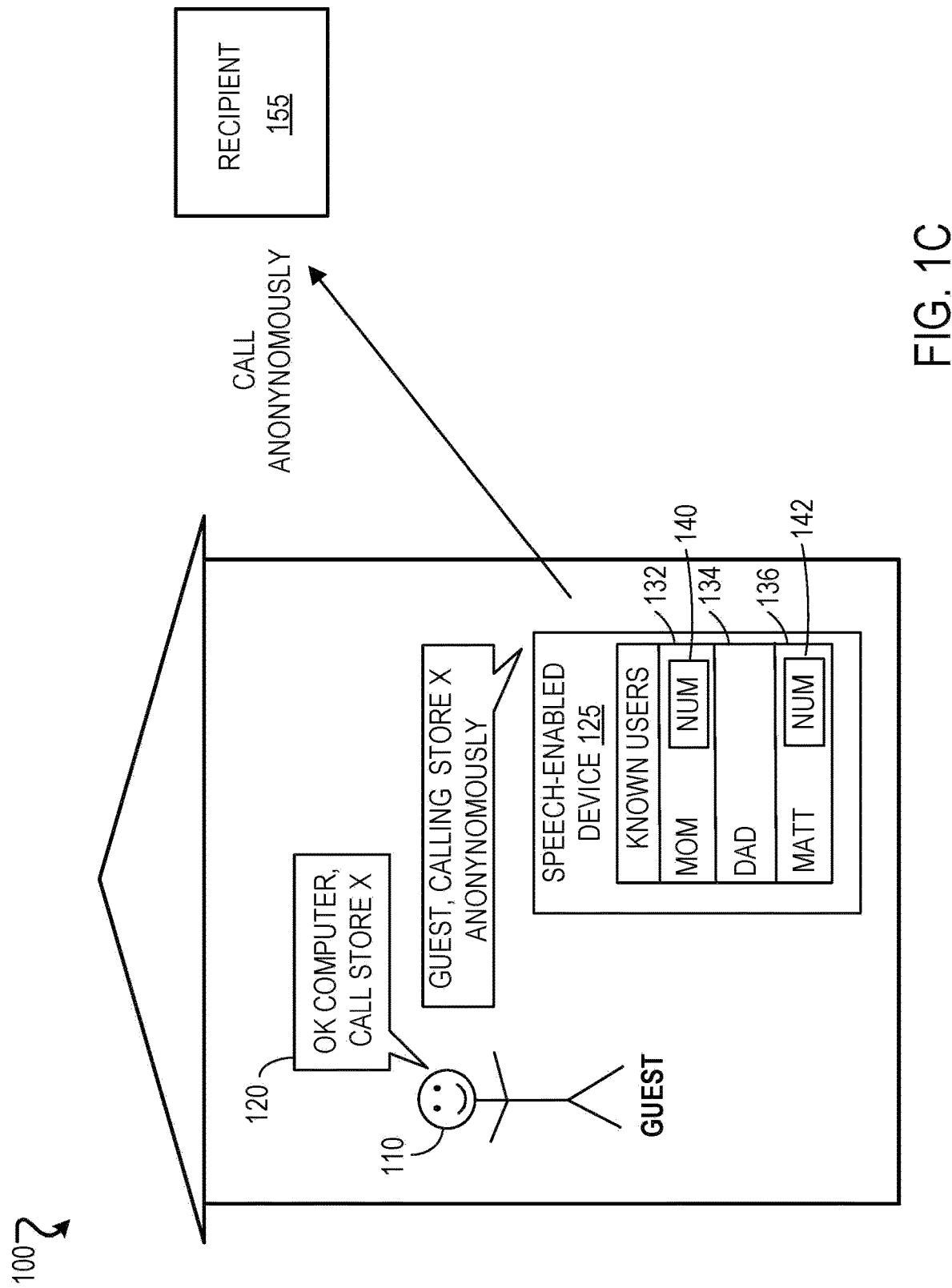

For example, FIG. 1A illustrates the speech-enabled device 125 receiving an utterance "OK Computer, call Store X," classifying a speaker as a known speaker, "Matt," and placing a call to Store X with a stored phone number for "Matt." In another example, FIG. 1B illustrates the speech-enabled device 125 receiving an utterance "OK Computer, call Store X," classifying a speaker as a known speaker, "Dad," and placing an anonymous call to Store X. In yet another example, FIG. 1C illustrates the speech-enabled device 125 receiving an utterance "OK Computer, call Store X," classifying a speaker as a guest speaker, and placing an anonymous call to Store X.

Figure 1D:
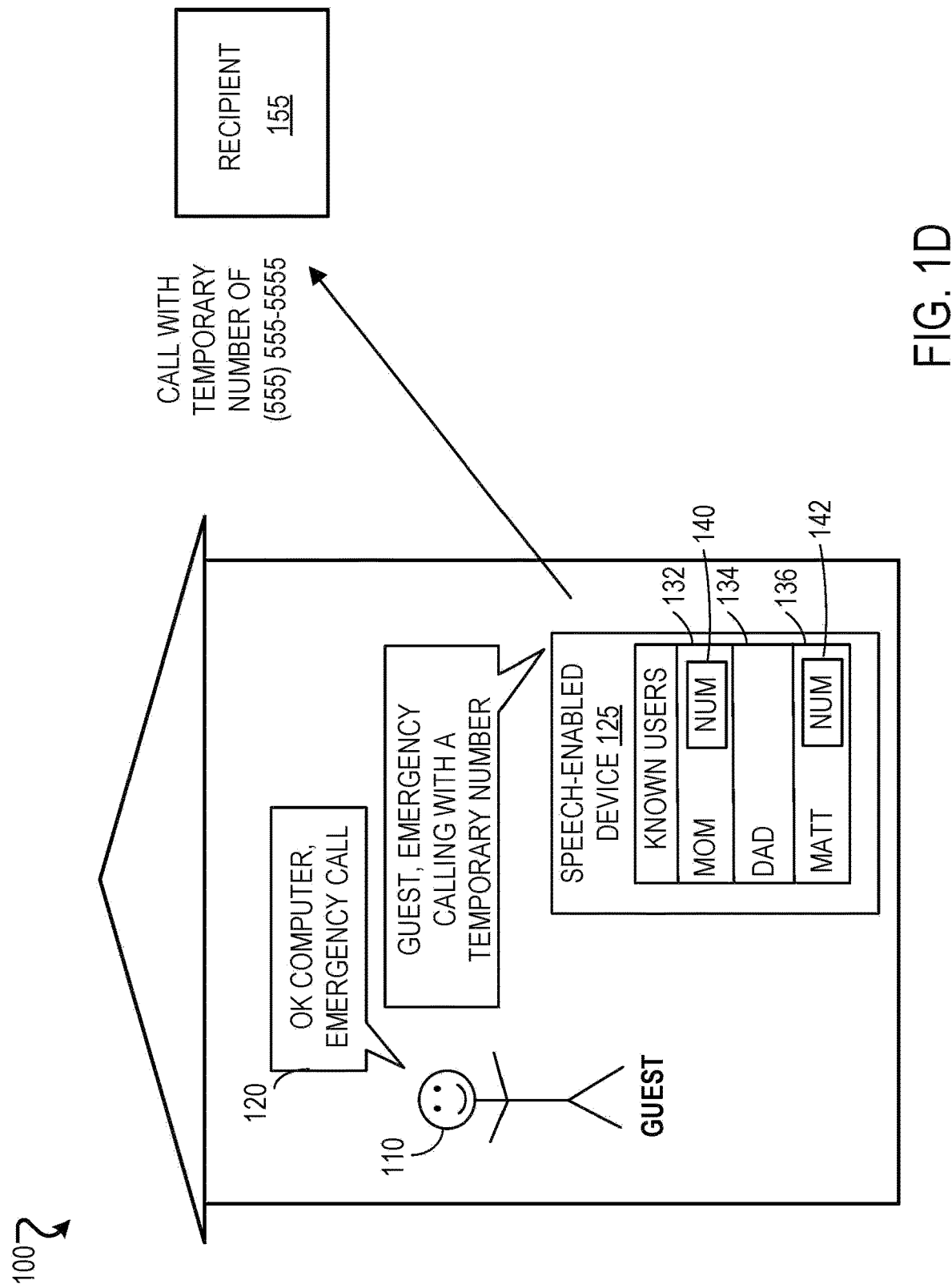

In still another example, FIG. 1D illustrates the speech-enabled device 125 receiving an utterance "OK Computer, emergency call," classifying a speaker as a guest speaker, and placing a call to emergency services with a temporary number. A temporary number may be a voice number that the emergency services can use to place a call back to the speech-enabled device 125 for at least a certain duration, e.g., one hour, two hours, twenty-four hours, etc. The temporary number may be unknown to the speaker so that the temporary number can only be used by emergency services to call back during emergencies.

In more detail, the speech-enabled device 125 may include one or more microphones and one or more speakers. The speech-enabled device 125 may receive utterances using the one or more microphones and output audible responses to the utterances through the one or more speakers.

The speech-enabled device 125 may store user account information for each known user of the speech-enabled device 125. For example, the speech-enabled device 125 may store a first set of user account information 132 for the known user "Mom," a second set of user account information 134 for the known user "Dad," and a third set of user account information 136 for the known user "Matt."

The user account information of a user may indicate a voice number that may be used as a caller number when the user places a call. For example, the first set of user account information 132 for "Mom" may store a first phone number 140 of (555) 111-1111, the second set of user account information 134 for "Dad" may be blank (i.e., no stored phone number), and the third set of user account information 136 for "Matt" may store a second phone number 142 of (555) 222-2222. In certain embodiments, user account information for a user may store multiple numbers, such as "home", "work", "mobile", etc.

The user account information of a user may indicate speaker identification features that may be used to recognize whether a speaker is the user. For example, the first set of user account information 132 for "Mom" may store mel-frequency cepstral coefficients (MFCCs) features, which collectively can form a feature vector, that represent the user "Mom" previously saying a hotword multiple times.

In some implementations, a user may register as a known user through a companion application on a mobile computing device where the mobile computing device is in communication with the speech-enabled device 125 via a local wireless connection. For example, a user "Mom" may log into her account through a companion application on her phone, then indicate in the companion application that she would like to register as a known user of the speech-enabled device 125, and then say a hotword multiple times into her phone.

As part of the registration, or afterwards, a user may indicate whether the user would like to associate a voice number for use as a caller number for calls that the user places using the speech-enabled device 125. For example, the user "Mom" may indicate she would like to have her calls placed by the speech-enabled device 125 indicating that the caller number is the phone number of her phone. In another example, the user "Mom" may indicate she would like to have her calls placed by the speech-enabled device 125 go through her phone when her phone is connected, e.g., through a Bluetooth connection, to the speech-enabled device 125.

The speech-enabled device 125 may place a call through types of call providers. For example, the speech-enabled device 125 may have an Internet connection and place a call using a Voice over Internet Protocol (VoIP). In another example, the speech-enabled device 125 may be in communication with a cellular network and place a call using the cellular network. In yet another example, the speech-enabled device 125 may be in communication with a cellular (or land-line) phone and place a call through the phone so the user speaks into and listens to the speech-enabled device 125, but the call is established through the phone.

In some implementations, the user may indicate a voice number to use as a caller number for calls that the user places using the speech-enabled device 125 based on selecting a call provider that the user wants to use. For example, the "Mom" could indicate that she wants her calls to be placed through a first call provider, e.g., a cellular network provider, for which she can also receive calls using the phone number (555) 111-1111, and later indicate that she instead wants her calls to be placed through a second call provider, e.g., a VoIP provider, for which she can receive calls using the phone number (555) 111-2222.

In some implementations, the speech-enabled device 125 may classify utterances as spoken by a particular user based on contextual information. Contextual information may include one or more of audio, visual, or other information. In regards to audio information, the speech-enabled device 125 may classify utterances based on speaker identification features (e.g., mel-frequency cepstral coefficients (MFCCs) features, which collectively can form a feature vector) of one or more utterances of a known user. For example, the speech-enabled device 125 may store speaker identification features for each of the known users speaking "OK Computer." In response to the speaker identification features in a currently received utterance sufficiently matching the stored speaker identification features of the known user "Dad" speaking "OK Computer," the speech-enabled device 125 may classify the utterance as spoken by the known user "Dad."

In another example, the speech-enabled device 125 may classify utterances based on an entire audio of an utterance. For example, the speech-enabled device 125 may determine whether the speech in an entire received utterance matches speech corresponding to the known user "Dad."

In regards to visual information, the speech-enabled device 125 may receive one or more images of at least a portion of a speaker and attempt to recognize the speaker based on the one or more images. For example, the speech-enabled device 125 may include a camera and determine that a speaker within view of the camera has a face that the speech-enabled device 125 classifies as matching a face corresponding to the known user "Dad." In other examples, the speech-enabled device 125 may attempt to match one or more of the speaker's fingerprint, retina scan, facial recognition, posture, co-presence of another device, or confirmation of identity from another device or element of software.

The speech-enabled device 125 may be a local front-end device that places calls in cooperation with a remote server. For example, when the speech-enabled device 125 receives an utterance "OK Computer, call Store X," the speech-enabled device 125 may detect when a speaker says a hotword "OK Computer," classify a user as "Mom" based on speaker identification features in the utterance of "OK Computer," and provide a representation of "Call Store X" and an indication that the speaker is "Mom" to a server. The server may then transcribe "Call Store X," determine that the text "Call Store X" corresponds to an action of placing a call, that Store X has a phone number of (555) 999-9999, and that "Mom" has indicated that her calls should be placed through her VoIP account with a caller number of (555) 111-1111. The server may then send an instruction of "Call (555) 999-9999 with VoIP account (555) 111-1111" to the speech-enabled device 125. In other implementations, the speech-enabled device 125 may perform the actions described by the remote server independently of a remote server.

In some implementations, the speech-enabled device 125 may classify utterances based on other information in addition to the audio information and the visual information. Specifically, the speech-enabled device 125 may classify utterances based on speaker identification features and a confirmation from a user to validate the identity of the spoken user. Additionally, the speech-enabled device 125 may classify utterances based on one or more received images of at least the portion of the speaker and a confirmation from the user to validate the identity of the spoken user. For example, as mentioned above, the speech-enabled device 125 may receive one or more utterances from a spoken user. The speech-enabled device 125 may determine that the speaker identification features in the one or more received utterances sufficiently match the stored speaker identification features of the known user "Dad" speaking "OK Computer." In response, the speech-enabled device 125 may confirm the determination that the user speaking is "Dad" by asking the user "Is this Dad speaking?" The speaker can respond by answering "Yes" or "No" in order to validate the speech-enabled device 125's confirmation. Should the speaker answer "No," the speech-enabled device 125 may ask an additional question, such as "What is the name of the speaker?" to determine if the name matches a known user name stored in the speech-enabled device 125.

Figure 2:
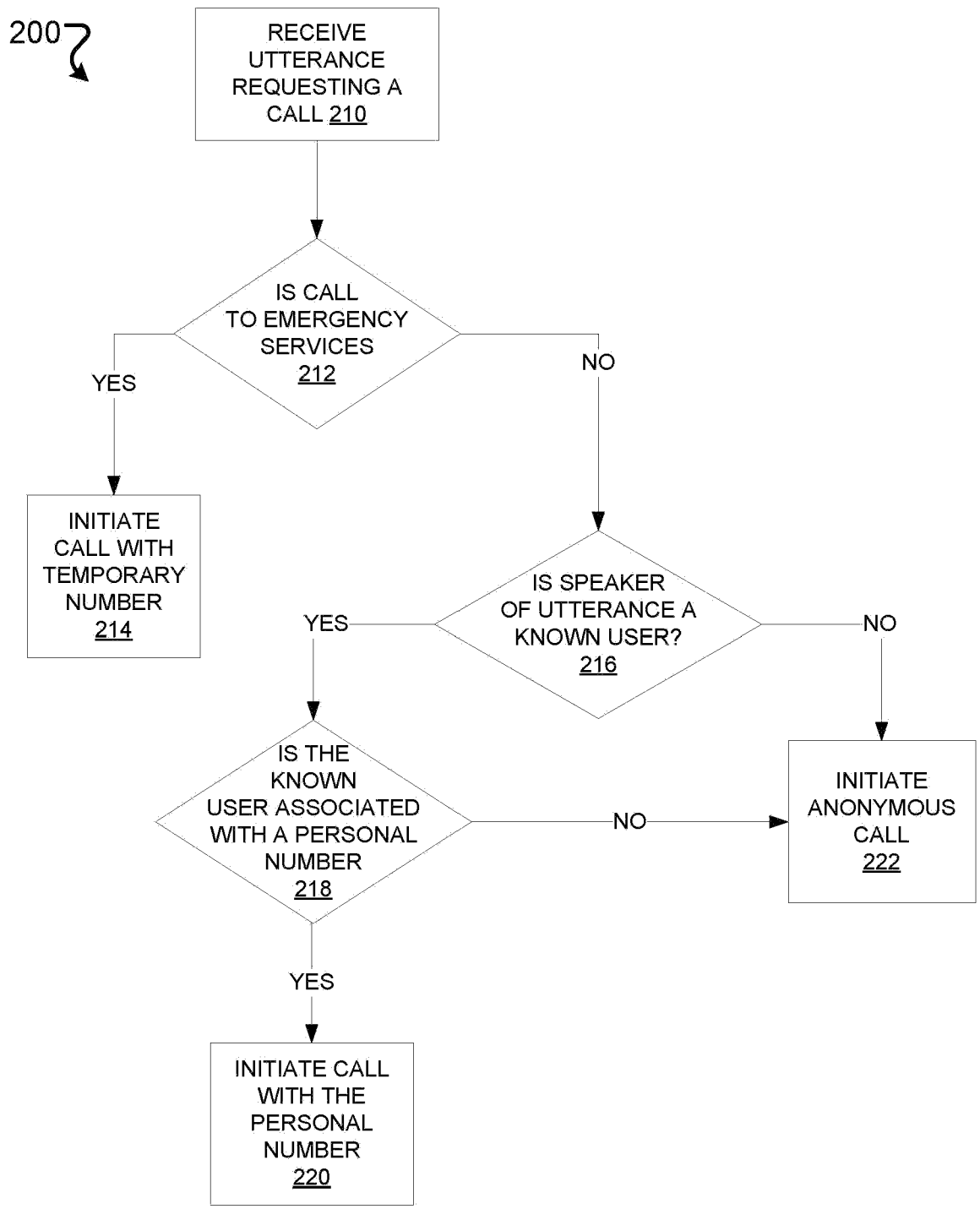
FIG. 2 is a flow diagram that illustrates an example of a process for placing a call.

FIG. 2 is a flow diagram that illustrates an example of a process 200 for placing a call. The operations of the process 200 may be performed by one or more computing systems, such as the system 100 of FIGS. 1A-1D.

The process 200 includes receiving an utterance (210). For example, the speech-enabled device 125 may receive an utterance of "OK Computer, call (555) 9999999."

The process 200 includes determining whether the call is to emergency services (212). For example, the speech-enabled device 125 may determine that a call to the number is not a call to emergency services as (555) 999-9999 is not associated with any emergency services. In another example, the speech-enabled device 125 may determine that a call to the number "911" is an emergency call is the number "911" is associated with emergency services.

If the process 200 determines that the call is to emergency services, the process 200 includes initiating a call with a temporary number (214). For example, the speech-enabled device 125 may request that a call provider generate a phone number that can be used for twenty-four hours to call back to the speech-enabled device and then initiate a call to emergency services showing the temporary number as the caller number.

If the process 200 determines that the call is not to emergency services, the process 200 includes determining whether the speaker of the utterance is a known user (216). For example, the speech-enabled device 125 may determine that the speaker of "OK Computer, call (555) 999-9999" is a known user in response to classifying the speaker as a known user "Matt." In another example, the speech-enabled device 125 may determine that the speaker is a known user in response to classifying the speaker as a known user "Dad." In yet another example, the speech-enabled device 125 may determine that the speaker is not a known user in response to classifying the speaker as a guest user.

In some implementations, determining whether the speaker of the utterance is a known user includes determining whether speech in the utterance matches speech corresponding to the particular known user. For example, the speech-enabled device 125 may determine that the way the speaker said "OK Computer" matches how the known user "Matt" says "OK Computer" and, in response, classify the speaker as the known user "Matt." In another example, the speech-enabled device 125 may determine that the way the speaker said "OK Computer" matches how the known user "Dad" says "OK Computer" and, in response, classify the speaker as the known user "Dad." Additionally or alternatively, determining whether the speaker of the utterance is a known user includes determining whether a visual image of at least a portion of the speaker matches visual information corresponding to the particular known user.

If the process 200 determines that the speaker of the utterance is a known user, the process 200 includes determining whether the known user is associated with a personal voice number (218). For example, the speech-enabled device 125 may determine that the known user "Matt" has account information that indicates a call provider that the known user would like to use when placing calls through the speech-enabled device 125 and, in response, determine the known user is associated with a personal phone number. In another example, the speech-enabled device 125 may determine that the known user "Dad" does not have account information that indicates a call provider that the known user would like to use when placing calls through the speech-enabled device 125 and, in response, determine the known user is not associated with a personal phone number.

If the process 200 determines that the known user is associated with a personal voice number, the process 200 includes initiating a call with the personal voice number (220). For example, the speech-enabled device 125 may contact the call provider indicated by the account information of "Matt" and request a call be placed for "Matt" to the phone number (555) 999-9999.

Returning to 218, if the process 200 determines that the known user is not associated with a personal voice number, the process includes initiating an anonymous call (222). For example, the speech-enabled device 125 may request that a call provider place an anonymous call to (555) 999-9999.

Returning to 216, if the process 200 determines that the speaker of the utterance is not a known user, the process 200 includes initiating an anonymous call (222) as described above for 222.

While determining whether the call is to emergency services (212) is shown first in the process 200, the process 200 may be different. For example, the process 200 may instead first determine that the speaker is a known user as described above in (216), then determine that the known user is associated with a personal voice number as described above in (218), and next determine that the call is to emergency services as described above in (212), and then use the personal voice number of the known user. One reason to provide the personal voice number of a known user to emergency responders, instead of a temporary number for the speech-enabled device 125, is that emergency responders can then contact the known user whether or not the known user is near the speech-enabled device 125.

Figure 3:
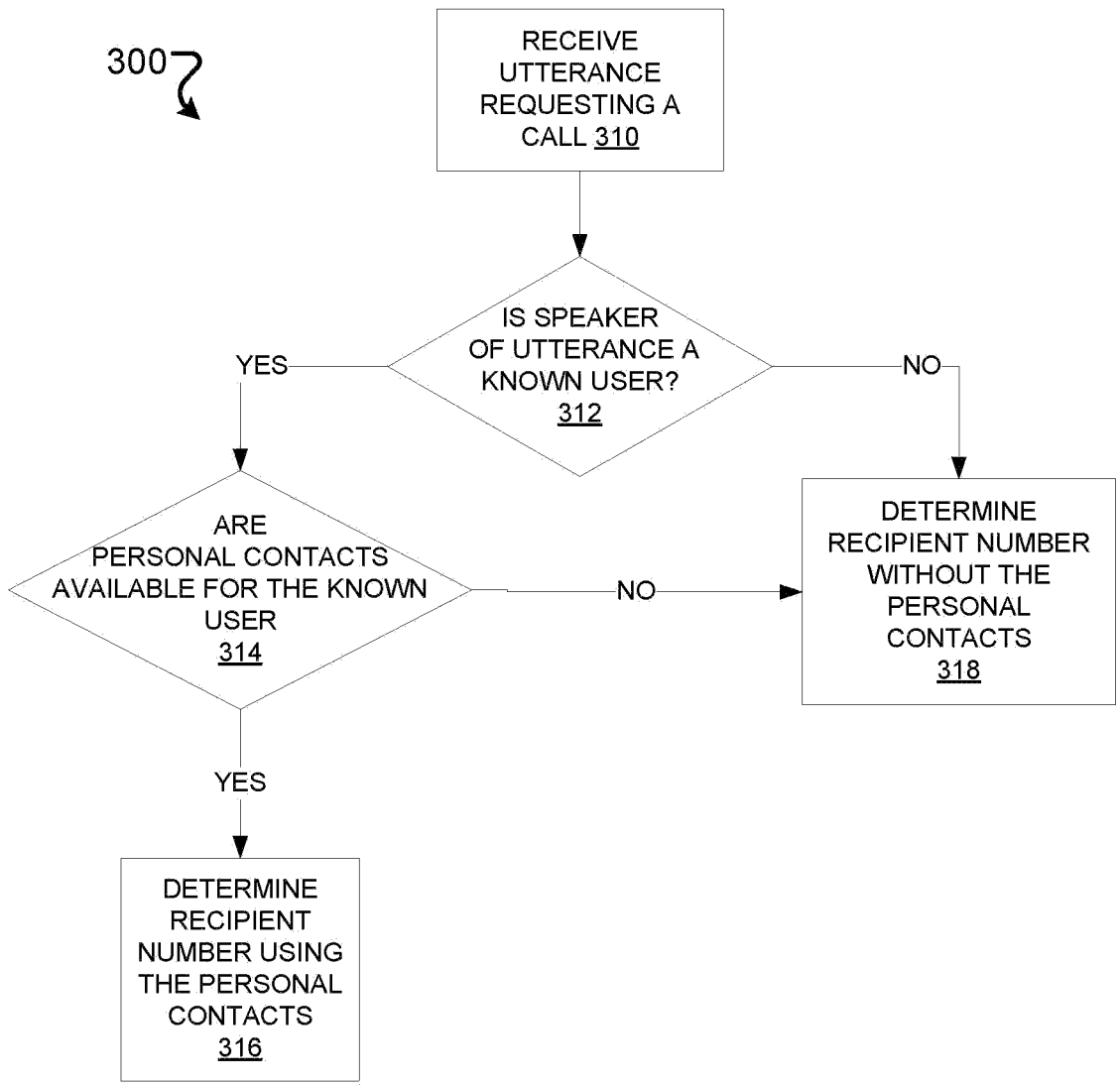
FIG. 3 is a flow diagram that illustrates an example of a process for determining a voice number to call.

FIG. 3 is a flow diagram that illustrates an example of a process 300 for determining a voice number to call. The operations of the process 300 may be performed by one or more computing systems, such as the system 100 of FIGS. 1A-1D.

The process 300 includes receiving an utterance requesting a call (310). For example, the speech-enabled device 125 may receive an utterance for a user 110 requesting a call such as "OK Computer, call Grandma."

The process 300 includes determining if the speaker of the utterance is a known user (312). For example, the speech-enabled device 125 may classify the speaker as the known user "Mom."

If the process 300 determines that the speaker of the utterance is a known user, then the process 300 includes determining if personal contacts are available for the known user (314). For example, the speech-enabled device 125 may determine that personal contacts are available for the known user "Mom" based on determining that the speech-enabled device 125 has access to contact records for the known user "Mom." Personal contacts for a known user may refer to telephone contact entries that were created for the known user. For example, a known user may create a telephone contact entry for the known user by opening an interface for creating a new telephone contact entry, typing in a phone number "(123) 456-7890" and a contact name "John Doe," and then selecting to create a telephone entry labeled with a name of "John Doe" and indicating a phone number of "(123) 456-7890." A contact list of a known user may be formed by all the personal contacts for the known user. For example, the contact list for a known user may include a contact entry for "John Doe" as well as other contact entries created by the known user.

If the process 300 determines that personal contacts are available for the known user, then the process 300 includes determining a number associated with the recipient using the personal contacts (316). For example, the speech-enabled device 125 scans the personal contact list for the recipient, "Grandma," from contact records of the known user "Mom," and retrieves the number associated with "Grandma."

Returning to 314, if the process 300 instead determines that the personal contacts for the known user are not available, the process 300 includes determining the recipient number without the personal contacts associated with the known user (318). For example, the speech-enabled device 125 may search the Internet for the recipient number. In this example, the speech-enabled device 125 may search the Internet for recipient numbers corresponding to "Grandma" that may be nearby to the known user using geographic locational service, be unable to identify a recipient number, and provide a voice message to the known user stating "Contact number not found." If a recipient number is not found, the speech-enabled device 125 may prompt the speaker to speak a voice number to call and then call that number.

Returning to 312, if the process 300 instead determines that the speaker of the utterance is not a known user, the process 300 includes determining the recipient number without the personal contacts (318) as described above.

Figure 4:
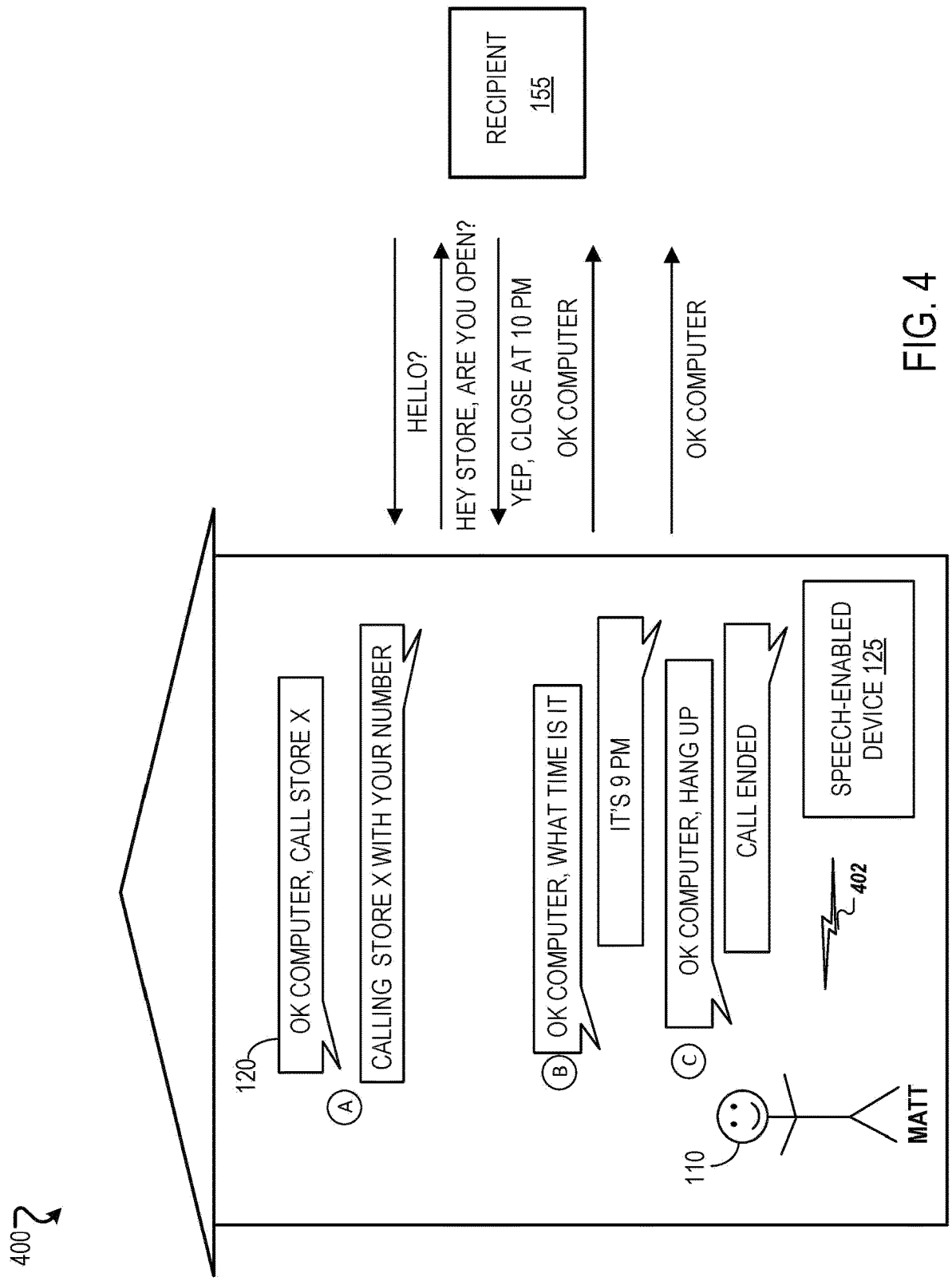
FIG. 4 is a block diagram that illustrates an example interaction with a speech-enabled device during a call.

FIG. 4 is a block diagram that illustrates an example interaction with a speech-enabled device during a call. FIG. 4 illustrates various operations in stages (A) through (C) which can be performed in the sequence indicated or in another sequence.

In some implementations, the speech-enabled device 125 may perform actions in response to detecting an utterance including a predetermined phrase, such as a hotword, that a user speaks to address the speech-enabled device 125 during a call. For example, FIG. 4 illustrates the speech-enabled device 125 receiving an utterance "OK Computer, call Store X," classifying a speaker as a known speaker, "Matt," and placing a call to Store X with a stored phone number for "Matt." In addition, the speaker, "Matt" may communicate commands to the speech-enabled device 125 during the call unheard to the recipient 155. In response to the commands during a phone call, the speech-enabled device 125 can block at least a portion of the utterance from the recipient.

During stage (A), the speech-enabled device 125 receives an utterance 120 "OK Computer, call Store X." In response to receiving the utterance 120, the speech-enabled device 125 classifies the speaker using one of the aforementioned methods as a known speaker, "Matt," and returns a response to "Matt" reciting "Calling Store X with your number." The response indicates to the user 110 that the speech-enabled device 125 understood the utterance by classifying the speaker, taking an action associated with the command, and using a number associated with "Matt". During stage (B), the speech-enabled device 125 initiates a call to the recipient 155, e.g., Store X. For example, the speech-enabled device 125 initiates a phone call between the user 110 and the recipient 155. The speech-enabled device 125 calls the recipient 155 using user 110's number that can be used by the recipient 155 to call back the user 110. The recipient 155 answers the phone call by saying "Hello?" In response, the user 110 speaks to the recipient 155 via speech-enabled device 125, "Hey Store, are you open?" The recipient 155 responds with "Yep, close at 10 PM."

During stage (B), the speech-enabled device 125 detects a hotword from a command from user 110 during the phone call with the recipient 155. For example, the speech-enabled device 125 obtains a command from user 110 reciting "OK Computer, what time is it." In response to the received utterance during the phone call, the speech-enabled device 125 transmits the user 110 speaking the hotword "OK Computer" but then blocks off the command after the hotword so the recipient 155 hears "OK Computer" but not "What time is it." The speech-enabled device 125 responds to only the user 110 reciting "It's 9 PM" so that the recipient 155 does not hear the response. Alternatively, an amount of latency can be introduced into the communication to permit the speech-enabled device 125 to detect hotwords prior to broadcasting the same to the recipient as part of the call. In this way, not only the instruction associated with the hotword but the hotword itself can be blocked from delivery to the recipient as part of the call.

In some implementations, the speech-enabled device 125 may prevent the recipient 155 from hearing communication between the user 110 and the speech-enabled device 125 by placing a 2-way hold between the user 110 and recipient 155 after detecting the user 110 speaks a hotword. During a 2-way hold, the recipient 155 and the user 110 may not be able to hear one another. For example, in response to receiving the utterance "OK Computer, what time is it," the speech-enabled device 125 may initiate a 2-way hold right after "OK Computer" and before "what time is it," so that the recipient 155 at Store X only hears "OK Computer."

The speech-enabled device 125 may end the 2-way hold once the speech-enabled device 125 determines that a command from the user has been resolved. For example, the speech-enabled device 125 may determine that a response of "It's 9 PM" answers the user's question of "What time is it," and in response, end the 2-way hold. In another example, the speech-enable device 125 may respond "What day would you like to set the alarm at 7 PM" and continue a 2-way hold for the user 110 to provide a day in response to the user 110 saying "OK Computer, set an alarm for 7 PM." In other embodiments, the user 110 may request the speech-enabled device 125 to place the call on hold, e.g., by reciting "OK Computer, place call on hold." The speech-enabled device 125 may continue to hold the call until the user requests to end the hold, e.g., by reciting "OK computer, resume call."

In some implementations, the speech-enabled device 125 may block commands that have a long interaction with the user 110. For example, the speech-enabled device 125 may block features related to playing media such as music, news, or podcast; playing a daily brief; third party conversation actions; making an additional phone call; and, playing games, such as trivia. The speech-enabled device 125 may provide an error when blocking these features, e.g., outputting "Sorry, music cannot be played during a call," or ignore any command associated with one of these tasks and continue the phone call.

During stage (C), the speech-enabled device 125 detects a hotword from another command from user 110 during the phone call with the recipient 155 at Store X. For example, the speech-enabled device 125 obtains a command from user 110 reciting "OK Computer, hang up." In response to the received utterance during the phone call, the speech-enabled device 125 responds to the user 110 reciting "Call Ended" or a non-verbal audio cue. Additionally, the speech-enabled device 125 does not transmit the response "Call Ended" or non-verbal audio cue to the recipient 155 at Store X.

Figure 5:
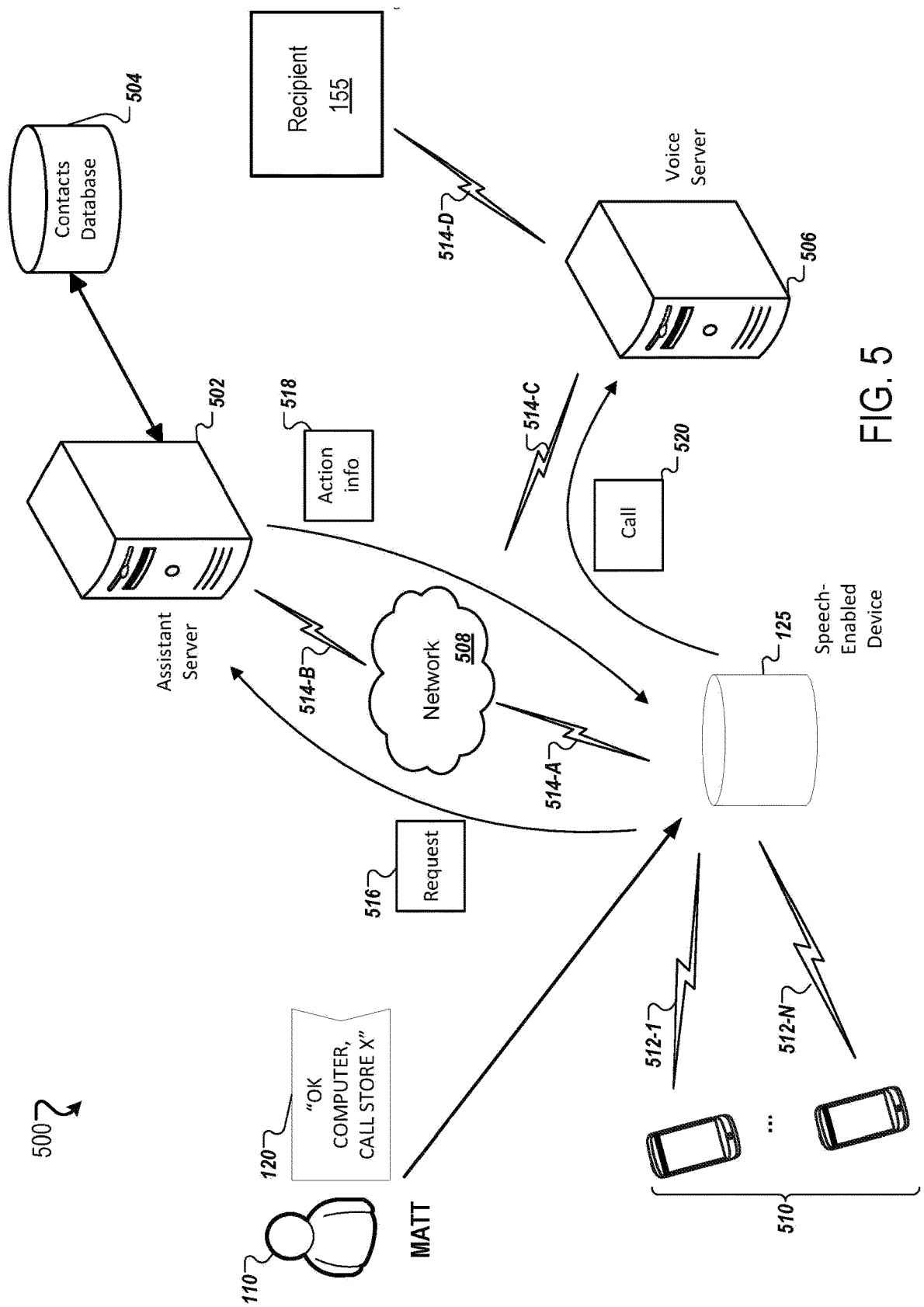
FIG. 5 is a block diagram that illustrates an example of a system for interacting with a speech-enabled device placing a call.

FIG. 5 is a block diagram that illustrates an example of a system 500 for interacting with a speech-enabled device placing a call. The system 500 includes the speech-enabled device 125, an assistant server 502, a contacts database 504, a voice server 506, client devices 510, a network 508, and communication links 512 and 514.

In some implementations, the speech-enabled device 125 can include one or more computers, and may include computers distributed across multiple geographic locations. The speech-enabled device 125 communicates with one or more client devices 510, an assistant server 502, and a voice server 506.

In some implementations, the assistant server 502 and the voice server 506 can each include one or more computers, and may include computers distributed across multiple geographic locations. The assistant server 502 communicates with the speech-enabled device 125 and a contacts database 504. The voice server 506 communicates with the speech-enabled device 125 and one or more recipients, such as Store X.

The client devices 510 can be, for example, a desktop computer, a laptop computer, a tablet computer, a wearable computer, a cellular phone, a smart phone, a music player, an e-book reader, a navigation system, or any other appropriate computing device. The network 508 can be wired or wireless of a combination of both, and can include the Internet.

In some implementations, the speech-enabled device 125 may connect to the client devices 510 over communication links 512 using short-range communication protocols, such as Bluetooth, WiFi, or other short-range communication protocols. For example, the speech-enabled device 125 may pair and connect up to 7 different client devices 510, each with an associated communication link 512. In some implementations, the speech-enabled device 125 may route audio from one of the client devices 510 at any given time.

In some implementations, the speech-enabled device 125 may receive an utterance "OK Computer, call Store X" 120 from user 110. The speech-enabled device 125 may further classify the speaker (user 110) as a known speaker, "Matt." For example, the speech-enabled device 125 may compare speaker identification features included in the user account information associated with "Matt" to the received hotword spoken by user 110. The speech-enabled device 125 may determine the user 110 is "Matt" in response to the comparison. In some implementations, the speech-enabled device 125 may then transmit an audio representation of the utterance as a query to the assistant server 502 for further processing.

In some implementations, the speech-enabled device 125 may stop various events when a user 110 requests to place a call. For example, the speech-enabled device 125 may stop playing music or an alarm once a user says "OK Computer, call Store X." To stop various events when a user 110 requests to place a call, the speech-enabled device 125 may store particular types of events that should be stopped when a user is requesting to play a call and, in response to detecting that a user is placing a call, end those stored particular types of events. For example, the speech-enabled device 125 may store that the events of playing music and alarms are to be stopped when a user places a call and, in response to detecting that a user is placing a call, end any events of playing music and alarms but continue other events.

In some implementations, the speech-enabled device 125 may require user 110 to disable any events before placing a phone call. For example, the speech-enabled device 125 may currently be playing music or ringing due to an alarm or timer. The speech-enabled device 125 may not allow user 110 to make any calls until the user 110 dismisses the music, or ringing due to an alarm or timer. In some implementations, the user 110 may disable the music or ringing due to an alarm or timer by saying "OK Computer, turn off Music" or "OK Computer, turn off Alarm," respectively. In other implementations, the user 110 may disable the music or ringing due to an alarm or timer by tapping an interactive button on the speech-enabled device 125. For example, the speech-enabled device 125 may store particular events that require user interaction to disable when the user requests to place a call. In response to detecting that the user requests to place a call and at least one of the particular events is happening, the speech-enabled device 125 may recite a warning message to the user saying "Please disable event before making call" and ignore the request to place a call. Once the user commands the speech-enabled device 125 to disable the particular event, by either sending a voice command to the speech-enabled device 125 or tapping the interactive button on the speech-enabled device 125, the user may then request the speech-enabled device 125 to place a call.

In some implementations, the speech-enabled device 125 may warn the user 110 of an upcoming alarm in response to receiving a command from the user 110 to place a phone call. For example, the user 110 may set an alarm to ring on the speech-enabled device 125 at 6:30 PM. The user 110 may say the utterance "OK Computer, call Store X" to the speech-enabled device 125 at 6:29 PM. In response to receiving the utterance, the speech-enabled device 125 may output to the user saying "Please disable the alarm before placing the phone call" or "An alarm is set for 6:30 PM in one minute, would you like to disable this alarm before I place this call?" Subsequently, the user 110 may disable the alarm or let the alarm pass before placing the phone call with the speech-enabled device 125.

In some implementations, the speech-enabled device 125 may warn the user 110 of an upcoming alarm based on determining whether an alarm is set to go off within a predetermined length of time, e.g., one minute, five minutes, fifteen minutes, or some other length of time, of a phone call being placed. For example, the speech-enabled device 125 may receive a request to place a call at 6:29 PM, determine that within five minutes of 6:29 PM an alarm is set at 6:30 PM, and in response to determining that an alarm is set within five minutes of 6:29 PM, provide a warning to the user 110 of the upcoming alarm.

In some implementations, the assistant server 502 obtains the request 516. For example, the speech-enabled device 125 may send data that includes a search request indicating the audio representation of the utterance received from user 110. The data may indicate the identified known speaker, "Matt," the audio representation of the utterance, "OK Computer, call Store X" 120, a unique ID associated with the speech-enabled device 125, and a personal results bit associated with the identified known speaker, "Matt." The unique ID associated with the speech-enabled device 125 indicates to the assistant server 502 where to send a response. For example, the unique ID may be an IP address, a URL, or a MAC address associated with the speech-enabled device 125.

In some implementations, the assistant server 502 processes the obtained request 516. Specifically, the assistant server 502 parses the obtained request 516 to determine a command associated with the utterance. For example, the assistant server 502 may process the obtained request 516 by converting the audio representation of the utterance to a textual representation of the utterance. In response to the conversion, the assistant server 502 parses the textual representation for the command following the hotword, "call Store X." In some implementations, the assistant server 502 determines an action associated with the textual command. For example, the assistant server 502 determines the action from the obtained request 516 is to "call Store X" by comparing the textual action "call" to stored textual actions.

In addition, the assistant server 502 resolves a number for the recipient, "Store X," by accessing the contacts database 504. In some implementations, the assistant server 502 accesses the contacts database 504 to retrieve a contact associated with a known user. The contacts database 504 stores the contacts by indexing the contacts by a known user name associated with the contacts. For example, the contacts database 504 includes an entry for "Matt" that further includes personal contacts associated with 'Matt." The personal contacts include a name and associated number, such as "Mom"—(555) 111-1111, "Dad"—(555) 222-2222, and "Store X"—(555) 3333333.

Additionally, the assistant server 502 may only resolve a number for the recipient when the personal results bit, received in the obtained request 516, is enabled. If the personal results bit is not enabled, or "0," then the assistant server 502 transmits an identifier in the action message 518 to indicate to the speech-enabled device 125 to relay a message to the user 110 that recites "Please allow Computer to access Personal Contacts." If the personal results bit is enabled, or "1," then the assistant server 502 accesses the contacts database 504 for the identified known speaker's personal contacts. In some implementations, the assistant server 502 retrieves a number associated with the recipient in the identified known speaker's personal contacts. In this example, the assistant server 502 retrieves the number (555) 333-3333 for Store X. In other implementations, the number for the recipient may be included in the textual representation for the command following the hotword. For example, the command may include "OK Computer, call 555-333-3333."

In some implementations, the assistant server 502 may identify a recipient in the obtained request 516 that is not found in the identified known speaker's personal contacts in the contact database 504. For example, the assistant server 502 may determine the textual representation for the command following the hotword from the obtained request 516 includes "call Grandma." However, the personal contacts from the contacts database 504 associated with "Matt" do not include an entry for "Grandma." Rather, the contacts include "Mom," "Dad," and "Store X." In order to resolve the number for the recipient, "Grandma," the assistant server 502 may search other databases and/or the Internet to find the number for "Grandma."

In searching other databases and/or the Internet, the assistant server 502 may search in a knowledge graph. For example, the assistant server 502 may not match "Company X Customer Service" with any record in a user's personal contacts, then search the knowledge graph for an entity with the name "Company X Customer Service," and identify a phone number stored in the knowledge graph for that entity.

In some implementations, the command may include calling a business in geographical proximity to the speech-enabled device 125. The assistant server 502 may search the Internet for a voice number associated with the nearest business to the speech-enabled device 125. However, should the assistant server 502 not find a number associated with the requested recipient, the assistant server 502 may transmit an identifier in the action message 518 to indicate to the speech-enabled device 125 to relay a message to the user 110 that recites "Contact Not Found." For example, the assistant server 502 may search in a maps database for a nearby local business with a name of "Store X" if unable to find a phone number for "Store X" in the personal contact records or knowledge graph.

In some implementations, the assistant server 502 may determine that the number included in the command may be an unsupported voice number. For example, the number may only include 7 digits, such as 123-4567. In response, the assistant server 502 may transmit an identifier in the action message 518 to indicate to the speech-enabled device 125 to relay a message to the user 110 that recites "Phone Number Not Supported."

In response to determining a contact number associated with the recipient, the assistant server 502 generates an action message 518 to the speech-enabled device 125. Specifically, the action message 518 may include the contact number and an action to trigger the call. For example, the action message 518 may include the phone number for "Store X" as 555-333-3333 and the action instructing the speech-enabled device 125 to immediately call "Store X." In some implementations, the assistant server 502 may include in the action message 518 an outbound number to use based on a context of the command. For example, if the command includes a call to emergency services, the assistant server 502 may include a number in the action message 518 that the recipient 155 can use to call back the speech-enabled device 125 for a particular period of time. For example, the phone number, (555) 888-8888, may be used for the next couple hours to place a call back to the speech-enabled device 125.

In some implementations, the speech-enabled device 125 obtains the action message 518 from the assistant server 502. In response to obtaining the action message 518, the speech-enabled device 125 takes action on the action message 518. For example, the action message indicates to the speech-enabled device 125 to call "Store X" using the indicated phone number, 555-333-3333.

In some implementations, the speech-enabled device 125 may call a recipient as designated by the assistant server 502 using a voice server 506 or an associated client device 510 based on a preference of user 110. Specifically, the preference of user 110 may be stored in the speech-enabled device 125. For example, the speech-enabled device 125 may determine that the preference of user 110 is to use the voice server 506, or voice over IP (VoIP), for any outbound calls. As such, the speech-enabled device 125 sends an indication to the voice server 506 to call the recipient. In some implementations, the voice server 506 may use an associated number for the outbound call. In some implementations, the speech-enabled device 125 may enable a user to select to use a VoIP provider from among multiple different VoIP providers and then use that VoIP provider when that user initiates future calls.

In some implementations, the speech-enabled device 125 may use a number associated with the voice server 506 to call emergency services in response to determining that user 110 is near the speech-enabled device 125. For example, the speech-enabled device 125 may call emergency services using the number associated with the voice server 506 in response to determining that one of the client devices 510 is connected to the speech-enabled device 125. By ensuring the connection between the client device 510 and the speech-enabled device 125, the speech-enabled device 125 can ensure the user 110 is near the speech-enabled device 125.

Alternatively, the speech-enabled device 125 may determine that a secondary preference of user 110 is to use an existing client device 510 to place an outbound call to the recipient. If the speech-enabled device 125 determines that the secondary preference of the user 110 is to call the recipient using an associated client device 510, the speech-enabled device 125 will verify a communication link 512 to the client device 510. For example, the speech-enabled device 125 may verify a Bluetooth connection to the client device 510. If the speech-enabled device 125 cannot create a Bluetooth connection to the client device 510, the speech-enabled device 125 may relay a message to user 110 reciting "Please make sure your Bluetooth connection is active." Once the Bluetooth connection is established, the speech-enabled device 125 sends an indication to the client device 510 to call the recipient. In other embodiments, should the speech-enabled device 125 not be able to discover the client device 510 by any means of short range communication protocols, the speech-enabled device 125 may place a phone call to the recipient using a private number with the voice server 506 to the recipient.

In some implementations, the speech-enabled device 125 may play an audible sound for the user 110 to hear in response to connecting to the recipient phone. For example, the speech-enabled device 125 may play an audible ringing tone if the recipient phone is available for answering. In another example, the speech-enabled device 125 may play a busy signal tone if the recipient phone is unavailable for answering. In another example, the speech-enabled device 125 may provide a voice message to the user if the recipient phone number is invalid, such as "Phone Number Not Supported." In other embodiments, the user 110 may tap an interactive button on the speech-enabled device 125 to disconnect a call to the recipient phone during an attempt to connect the call to the recipient phone.

In some implementations, the speech-enabled device 125 may redial a most recent call placed by the user 110. For example, user 110 can say "OK Computer, Redial" without saying the number and the speech-enabled device 125 will redial the last recipient number called. In some implementations, for the speech-enabled device 125 to redial a most recent call, the speech-enabled device 125 stores the settings associated with the most recent call in memory after each call. The settings associated with the most recent call in memory includes the user to place the call, the number used to make the call, and the recipient's number.

In some implementations, the speech-enabled device 125 may receive Dual Tone Multiple Frequencies (DTMF) tones to navigate interactive voice response systems. For example, user 110 can say "OK Computer, press N," where N is a * key, a # key, or a number between 0 and 9. In response, the speech-enabled device 125 may place a 2-way hold after detecting "OK Computer," generate a dial tone for the number N that is transmitted to the recipient 155, and end the 2-way hold.

In some implementations, the speech-enabled device 125 may provide a status light to the user 110. For example, the status light can be an LED light to indicate a status of the speech-enabled device 125. The status light may change color, blinking duration, or brightness to indicate connecting a call, a connected call, a call ended, receiving a voice command from a user, and providing a message to user 110.

In some implementations, the user 110 may end the call with a specific voice command. For example, the user 110 can say "OK Computer, stop the call," "OK Computer, hang up," or "OK Computer, disconnect the call." In some implementations, the recipient may end the phone call. After a call is ended, the speech-enabled device 125 may play an audible busy tone and return the speech-enabled device 125 to a previous state before connecting the phone call. For example, returning the speech-enabled device 125 to a previous state may include continuing to play media, such as a song, at a point where the media stopped when the call was initiated.

In some implementations, the speech-enabled device 125 may indicate when an incoming call is received. For example, the speech-enabled device 125 may flash an LED, audibly output a ringing noise, or audibly output "Incoming call," to indicate that the speech-enabled device 125 is receiving a call. In response, the user 110 may take an action towards the incoming call. For example, the user 110 may answer the call by saying one of the following: "OK Computer, pick up," "OK Computer, Answer," "OK Computer, Accept," or "OK Computer, Yes," to name a few examples. In another example, the user 110 may refuse the call and disconnect the attempt for a connection by saying one of the following: "OK Computer, No," "OK Computer, Refuse," or "OK Computer, Hang-up," to name a few examples.

In some implementations, the speech-enabled device 125 may only accept incoming calls made through a temporary number. Specifically, the speech-enabled device 125 may ring only when the incoming call is received from a call to the temporary number that was used to place an outgoing call to emergency services. For example, the speech-enabled device 125 may use a number (555) 555-5555 as a temporary number for outbound calls to dial emergency services, and may only accept incoming calls to the number (555) 555-5555.

In some implementations, the user 110 may transfer an incoming call on another device to the speech-enabled device 125 to use as a speaker phone. The user 110 may transfer the call while the call is ringing or during the call. For example, the user 110 may say "OK Computer, transfer call from my phone to you." In some implementations, the speech-enabled device 125 may communicate with the other device using a short range communication protocol to transfer the phone call. For example, the speech-enabled device 125 may connect to the other device using Bluetooth or WiFi for example, to instruct the other device to route a current phone call to a speaker of the speech-enabled device 125.

In some implementations, the user 110 may transfer a call from the speech-enabled device 125 to a client device 510.

Specifically, the user 110 may transfer the call while the call is ringing or during the call. This may be performed if the client device 510 is connected to the speech-enabled device 125 using at least one of the short range communication protocols, such as Bluetooth. For example, the user 110 may say "OK Computer, transfer call to my phone." Additionally, the user 110 may transfer a call from one speech-enabled device 125 to another speech-enabled device 125 located in a separate room. For example, the user 110 may say "OK Computer, transfer call to bedroom Computer." If the client device 510 or the other speech-enabled device 125 is not powered on or connected to the speech-enabled device 125, then the speech-enabled device 125 may recite "Please turn on device to establish connection."

Figure 6:
FIG. 6 is a flow diagram that illustrates an example of a process determining a caller number.

FIG. 6 is a flow diagram that illustrates an example of a process 600 for determining a caller number. The operations of the process 600 may be performed by one or more computing systems, such as the system 500.

The process 600 includes receiving an utterance that requests a voice call (610). For example, the speech-enabled device 125 may receive an utterance when a user says "OK Computer, call (123) 456-7890" and a microphone in the speech-enabled device 125 then generates audio data corresponding to the utterance. In some implementations, a voice call may refer to a call that includes only audio. In other implementations, a voice call may refer to a call that does not only include audio, e.g., a videoconference call that includes both audio and video.

The process 600 includes classifying the utterance as spoken by a particular known user (620). For example, the speech-enabled device 125 may classify the utterance "OK Computer, call (123) 456-7890" as having been spoken by a particular known user "Matt." In another example, the speech-enabled device 125 may classify the utterance "OK Computer, call (123) 456-7890" as having been spoken by a user that is not known to the speech-enabled device.

Classifying the utterance as spoken by a particular known user may include determining whether speech in the utterance matches speech corresponding to the particular known user. For example, as previously described, the speech-enabled device 125 may store MFCCs corresponding to the known user "Matt" previously speaking a hotword "OK Computer," determine MFCCs from the hotword "OK Computer" in the utterance just received, then determine the MFCCs from the utterance match the MFCCs stored for the known user "Matt," and, in response, classify the utterance as spoken by the known user "Matt." In another example, the speech-enabled device 125 may store MFCCs corresponding to the known user "Matt" previously speaking a hotword "OK Computer," determine MFCCs from the hotword "OK Computer" in the utterance just received, then determine the MFCCs from the utterance do not match the MFCCs stored for the known user "Matt," and, in response, not classify the utterance as spoken by the known user "Matt."

Classifying the utterance as spoken by a particular known user may include determining whether a visual image of at least a portion of the speaker matches visual information corresponding to the particular known user. For example, as previously described above, the speech-enabled device 125 may include a camera, obtain an image of the speaker's face captured by the camera, determine that the speaker's face in the image matches information that describes the face of the known user "Matt," and, in response to that determination, classify the speaker as the known user "Matt." In another example, the speech-enabled device 125 may include a camera, obtain an image of the speaker's face captured by the camera, determine that the speaker's face in the image does not match information that describes the face of the known user "Matt," and, in response to that determination, classify the speaker as not being the known user "Matt." In some implementations, the visual image and speech may be considered in combination to classify whether the utterance was spoken by a particular known user.

The process 600 includes determining whether the particular known user is associated with a personal voice number (630). For example, the speech-enabled device 125 may determine that the known user "Matt" is associated with a personal phone number of (555) 222-2222. In another example, the speech-enabled device 125 may determine that the particular known user "Dad" is not associated with a personal number.

Determining whether the particular known user is associated with a personal voice number may include accessing account information of the particular known user and determining whether the account information of the user stores a voice number for the particular known user. For example, the speech-enabled device 125 may access account information of the known user "Matt" stored on the speech-enabled device 125, determine that the account information includes a personal phone number of (555) 2222222 and, in response, determine that the known user "Matt" is associated with a personal number. In another example, the speech-enabled device 125 may access account information of the known user "Dad" stored on the speech-enabled device 125, determine that the account information does not include a personal phone number and, in response, determine that the known user "Dad" is not associated with a personal number.

Additionally or alternatively, determining whether the particular known user is associated with a personal voice number may include providing, to a server, an indication of the particular known user and a representation of the utterance and receiving, from the server, the personal voice number of the particular known user, a voice number to call, and an instruction to place a voice call. For example, in some implementations the speech-enabled device 125 may not store personal phone numbers and the assistant server 502 may store personal phone numbers. Accordingly, the speech-enabled device 125 may provide the assistant server 502 an audio representation of the utterance "OK Computer, call (123) 456-7890" along with an indication that the speaker is the known user "Matt." The assistant server 502 may then transcribe the utterance, determine from "Call" in the transcription that the utterance is requesting to initiate a call, determine from the transcription that "(123) 456-7890" is the number to call, in response to determining that the utterance is requesting a call, access stored account information for the known user "Matt," determine the stored account for the known user "Matt" includes a personal voice number of (555) 222-2222 and, in response, provide an instruction to the speech-enabled device 125 to place a call to the number (123) 456-7890 showing (555) 222-2222 as the telephone number that is initiating the call.

Determining whether the particular known user is associated with a personal voice number may include accessing an account of the particular known user, determining whether the account of the user indicates a phone, and determining that the phone is connected with a speech-enabled device. For example, after the speech enabled device 125 classifies the utterance as having been spoken by the known user "Matt," the speech-enabled device 125 may access stored account information to determine whether a particular phone is indicated as being associated with the known user "Matt," in response to determining that the account indicates a particular phone, determine whether the particular phone is connected, e.g., through Bluetooth®, and, in response to determining that the particular phone is connected, then initiate the telephone call through the particular phone.

The process 600 includes initiating the voice call with the personal voice number (640). For example, the speech-enabled device 125 may provide an instruction to the voice server 506 to initiate a call to "(123) 456-7890" using the personal number of "(555) 222-2222." In some implementations, initiating the telephone call with the personal voice number may include initiating the telephone call through a VoIP call provider. For example, the voice server 506 may be a VoIP provider and the speech-enabled device 125 may request the voice server 506 initiate the call. In another example, the speech-enabled device 125 may provide an instruction to initiate a call to a phone associated with the known user "Matt" determined to be connected to the speech-enabled device.

Figure 7:
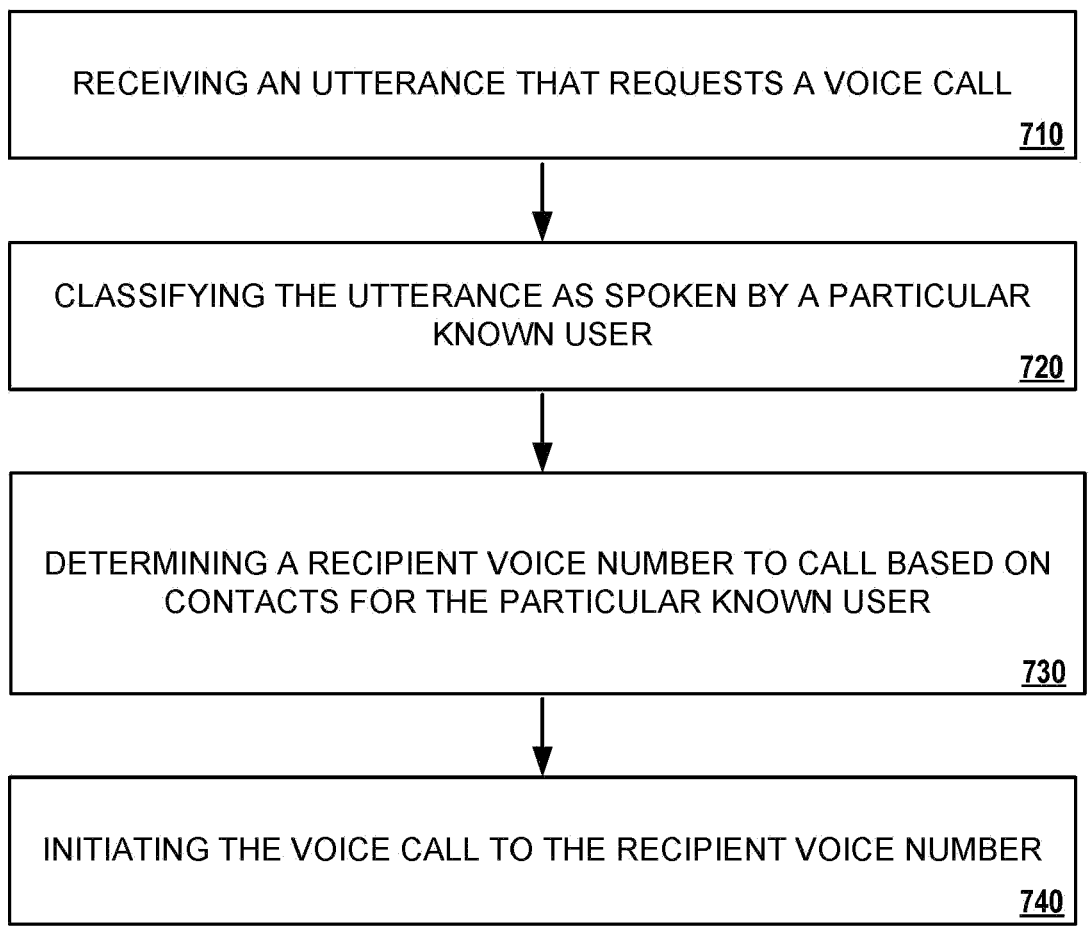
FIG. 7 is a flow diagram that illustrates an example of a process for determining a recipient number to call.

FIG. 7 is a flow diagram that illustrates an example of a process for determining a recipient number to call. The operations of the process 600 may be performed by one or more computing systems, such as the system 500.

The process 700 includes receiving an utterance that requests a voice call (710). For example, the assistant server 502 may receive, from the speech-enabled device 125, a representation of an utterance of "Call Grandma" and an indication that the utterance was determined by the speech-enabled device 125 as having been spoken by the known user "Matt." The indication may be an inclusion of an alphanumeric value that uniquely identifies an account of Matt from accounts of other users, or a binary value associated with the alphanumeric value that indicates whether the speaker of the utterance is associated with the account identified by the alphanumeric value.

The process includes classifying the utterance as spoken by a particular known user (720). For example, the assistant server 502 may classify the utterance as having been spoken by the known user "Matt." Classifying the utterance as spoken by a particular known user may include obtaining an indication that speech in the utterance was determined by a speech-enabled device to match speech corresponding to the particular known user. For example, the assistant server 502 may determine that the speech-enabled device 125 provided a value of "854978" that uniquely identifies the account of known user "Matt" as matching the speaker of the utterance "Call Grandma" and, in response, classify the utterance as having been spoken by the known user "Matt."

Additionally or alternatively, classifying the utterance as spoken by a particular known user may include determining whether speech in the utterance matches speech corresponding to the particular known user. For example, the assistant server 502 may generate MFCCs from the audio representation of the utterance, determine whether the MFCCs from the utterance match stored MFCCs for the known user "Matt," and, in response to determining that the MFCCs match, and classify the utterance as having been spoken by the known user "Matt."

The process 700 includes in response to classifying the utterance as spoken by the particular known user, determining a recipient voice number to call based on contacts for the particular known user (730). For example, in response to classifying "Call Grandma" as spoken by the known user "Matt," the assistant server 502 may determine a recipient number of "(987) 654-3210" to call based on telephone contacts stored for the known user "Matt." In another example, in response to classifying "Call Grandma" as spoken by the known user "Dad," the assistant server 502 may determine a recipient number of "(876) 543-2109" to call based on telephone contacts stored for the known user "Dad."

Obtaining contact entries created by the particular known user may include, in response to classifying the utterance as spoken by the particular known user, determining that contact entries of the particular known user are available and, in response to determining that contact entries of the particular known user are available, obtaining contact entries created by the particular known user. For example, in response to classifying the utterance as spoken by known user "Matt," the assistant server 502 may determine that telephone contact entries for the known user "Matt" are available, and, in response, access the telephone contact entries of the known user "Matt."

Determining that contact entries of the particular known user are available may include determining whether the particular known user previously indicated that the particular known user would like personalized results. For example, the assistant server 502 may receive a personalized results bit from the speech-enabled device 125 along with an utterance, determine that the personalized results bit is set to a value that indicates that the known user "Matt" would like personalized results, and, in response, determine that telephone contact entries of the known user "Matt" are available. In another example, the assistant server 502 may receive a personalized results bit from the speech-enabled device 125 along with an utterance, determine that the personalized results bit is set to a value that indicates that the known user "Dad" would not like personalized results, and, in response, determine that telephone contact entries of the known user "Dad" are not available.

In response to classifying the utterance as spoken by the particular known user, determining a recipient voice number to call based on contacts for the particular known user may include in response to classifying the utterance as spoken by the particular known user, obtaining contact entries created by the particular known user, identifying a particular contact entry from among the contact entries where the particular contact entry includes a name that matches the utterance, and determining a voice number indicated by the particular contact entry as the recipient voice number. For example, in response to classifying the utterance "Call Grandma" as spoken by a known user "Matt," the assistant server 502 may obtain telephone contact entries created by the known user "Matt," identify that one of the telephone contact entries is named "Grandma" that matches "Grandma" in the utterance and has a number of "(987) 6543210," and, determine the recipient telephone number is the number "(987) 654-3210."

Identifying a particular contact entry from among the contact entries where the particular contact entry includes a name that matches the utterance may include generating a transcription of the utterance and determining that the transcription includes the name. For example, assistant server 502 may generate a transcription of the utterance "Call Grandma," determine that "Grandma" from the transcription is identical to a name of "Grandma" for a telephone contact entry of the known user "Matt," and, in response, identify the contact entry named "Grandma."

The process 700 includes initiating the voice call to the recipient voice number (740). For example, the assistant server 502 may initiate a call to the recipient telephone number of "(987) 654-3210" obtained from the known user's telephone contact entry named "Grandma." Initiating the voice call to the recipient voice number may include providing, to a speech-enabled device, the recipient voice number and an instruction to initiate a voice call to the recipient voice number. For example, the assistant server 502 may provide the speech-enabled device 125 an instruction to initiate a call to the number (987) 654-3210 with the number of (555) 222-2222.

In some implementations, the process 700 may include receiving a second utterance that requests a second voice call, classifying the second utterance as not being spoken by any known user of the speech-enabled device 125, and in response to classifying the second utterance as not being spoken by any known user of the speech-enabled device, initiating a second voice call without accessing contacts for any known user of the speech-enabled device. For example, the assistant server 502 may receive a second utterance of "Call Store X," classify the second utterance as not being spoken by any known user of the speech-enabled device 125 and determine the "Store X" in the utterance is not a phone number, and in response to classifying the second utterance as not being spoken by any known user of the speech-enabled device and that "Store X" in the utterance is not a phone number, search a maps database for a nearby local business with a name of "Store X," identify a single nearby local business with the name "Store X" and a phone number of "(765) 432-1098" and, in response, initiate a second telephone call to (765) 432-1098 without accessing telephone contacts for any known user of the speech-enabled device.

Figure 8:
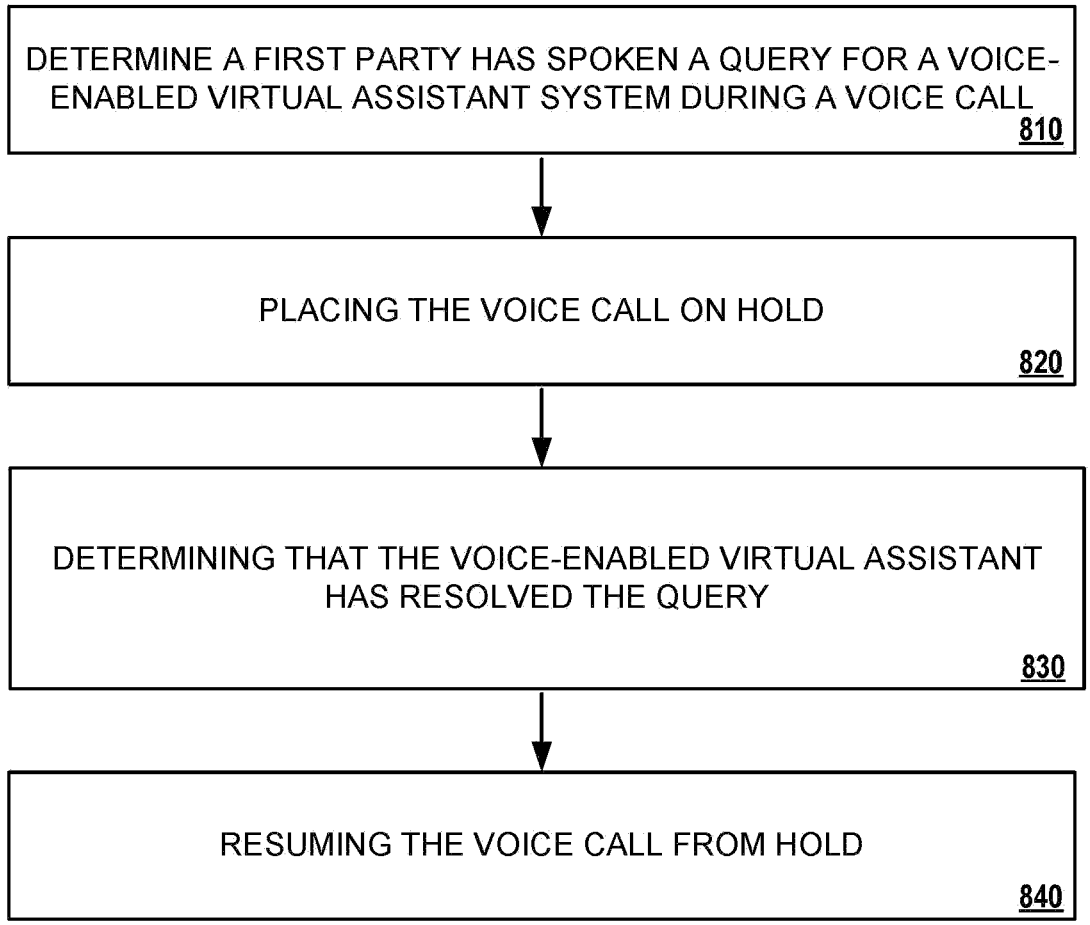
FIG. 8 is a flow diagram that illustrates an example of a process for handling queries during a voice call.

FIG. 8 is a flow diagram that illustrates an example of a process for handling queries during a voice call. The operations of the process 800 may be performed by one or more computing systems, such as the system 500.

The process 800 includes determining that a first party has spoken a query for a voice-enabled virtual assistant during a voice call between the first party and a second party (810). For example, the speech-enabled device 125 may determine that a user has spoken a query for the assistant server 502 during a telephone call between the user and another person. Determining that a first party has spoken a query for a voice-enabled virtual assistant during a telephone call between the first party and a second party may include determining, by a speech-enabled device, that a hotword was spoken by the first party during the telephone call. For example, the speech-enabled device 125 may determine that the hotword "OK Computer" has been spoken while a call is ongoing through the speech-enabled device 125. A call may be considered ongoing through the speech-enabled device 125 when a microphone and speaker of the speech-enabled device 125 are being used to pick up speech from the user for the other person and output speech of the other person to the user.

The process 800 includes in response to determining that the first party has spoken the query for the voice-enabled virtual assistant during the telephone call between the first party and the second party, placing the voice call between the first party and the second party on hold (810). For example, in response to determining that the first party has spoken a query of "OK Computer, what's my next appointment?" for the voice-enabled virtual assistant during the telephone call between the first party and the second party, the speech-enabled device 125 may place the telephone call on a two-way hold. The voice call may be placed on a two-way hold so that the other person may not hear a query to the voice-enabled virtual assistant from the user and may not hear a response to the query from the voice-enabled virtual assistant.

The process 800 includes placing the voice call on hold (820). For example, the speech-enabled device 125 may place the telephone call on a two-way hold. Placing the voice call between the first party and the second party on hold may include providing an instruction to a voice call provider to place the voice call on hold. For example, the speech-enabled device 125 may instruct the voice server 506 to place an ongoing call on hold. Additionally or alternatively, placing the voice call between the first party and the second party on hold may include routing audio from a microphone to the voice-enabled virtual assistant instead of a voice server and routing audio from the voice-enabled virtual assistant to a speaker instead of audio from the voice server. For example, the speech-enabled device 125 may route audio from the microphone in the speech-enabled device 125 to the assistant server 502 instead of the voice server 506 and route audio from the assistant server 502 to the speaker of the speech-enabled device 125 instead of audio from the voice server 506.

The process 800 includes determining that the voice-enabled virtual assistant has resolved the query (830). For example, the speech-enabled device 125 may determine that the assistant server 502 has resolved the query "OK Computer, what's my next appointment." Determining that the voice-enabled virtual assistant has resolved the query may include providing, to the voice-enabled virtual assistant, the query and an indication that a voice call is ongoing on the speech-enabled device and receiving, from the voice-enabled virtual assistant, a response to the query and an indication that the query is resolved. For example, the speech-enabled device 125 provide a representation of the query "OK Computer, what's my next appointment" and an indication of "Ongoing call=True" and, in response, receive a representation of synthesized speech of "Your next appointment is 'Coffee break' at 3:30 PM" as a response to the query and an indication of "Query resolved=True."

In some implementations, the voice-enabled virtual assistant may be configured to identify a command corresponding to the query, determine that the command can be executed during a voice call, and in response to determining that the command can be executed during a voice call, determine the response to indicate an answer to the command. For example, the assistant server 502 may receive a representation of the utterance "OK Computer, what's my next appointment," identify a command of "Identify Next Appointment" from a transcription from the representation of the utterance, determine the command "Identify Next Appointment" can be executed during a telephone call, and, in response to determining that the command can be executed during the telephone call, determine the response to indicate an answer of "Your next appointment is 'Coffee break' at 3:30 PM."

In some implementations, the voice-enabled virtual assistant may be configured to identify a command corresponding to the query, determine that the command cannot be executed during a voice call, and in response to determining that the command cannot be executed during a voice call, determine the response to indicate that the command cannot be executed. For example, the assistant server 502 may receive a representation of the utterance "OK Computer, play some music," identify a command of "Play Music" from a transcription from the representation of the utterance, determine the command "Play Music" cannot be executed during a telephone call, and, in response to determining that the command cannot be executed during the telephone call, determine the response to indicate an answer of "Sorry, I can't play music during a call."

In some implementations, determining that the command cannot be executed during a voice call includes obtaining a list of commands that can be executed normally during a voice call and determining that the command identified is not in the list of commands. For example, the assistant server 502 may obtain a list of commands that can be executed that includes "Identify Next Appointment" and does not include "Play Music," determine that the command "Play Music" is not identified in the list, and, in response, determine that the command "Play Music" cannot be executed normally during a telephone call.

In some implementations, determining that the command cannot be executed during a voice call includes obtaining a list of commands that cannot be executed normally during a voice call and determining that the command identified is in the list of commands. For example, the assistant server 502 may obtain a list of commands that cannot be executed that includes "Play Music" and does not include "Identify Next Appointment," determine that the command "Play Music" is identified in the list, and, in response, determine that the command "Play Music" cannot be executed normally during a telephone call.

The process 800 includes in response to determining that the voice-enabled virtual assistant has handled the query, resuming the voice call between the first party and the second party from hold (840). For example, the speech-enabled device 125 may resume the telephone call. In response to determining that the voice-enabled virtual assistant has handled the query, resuming the voice call between the first party and the second party from hold may include providing an instruction to a voice call provider to resume the voice call from hold. For example, the speech-enabled device 125 may provide an instruction to the voice server 506 to resume the telephone call from hold.

Additionally or alternatively, in response to determining that the voice-enabled virtual assistant has handled the query, resuming the voice call between the first party and the second party from hold may include routing audio from a microphone to a voice server instead of the voice-enabled virtual assistant and routing audio from the voice server to a speaker instead of audio from the voice-enabled virtual assistant. For example, the speech-enabled device 125 may route audio from the microphone to the voice server 506 instead of the assistant server 502 and may route audio from the voice server 506 to the speaker instead of audio from the assistant server 502.

In some implementations, in response to determining that the voice-enabled virtual assistant has handled the query, resuming the voice call between the first party and the second party from hold may include receiving an instruction from the voice-enabled virtual assistant to produce dual-tone multi-frequency signals and in response to receiving an instruction from the voice-enabled virtual assistant to produce dual-tone multi-frequency signals, providing a second instruction to the voice call provider to produce the dual-tone multi-frequency signals after providing the instruction to the voice call provider to resume the voice call from hold. For example, the speech-enabled device 125 may receive an instruction of "Generate DTMF for one" and, in response, instruct the voice server 506 to generate DTMF that represents a press of the "1" key.

In some implementations, the voice-enabled assistant server is configured to determine that the query indicates a command to generate one or more dual-tone multi-frequency signals and one or more numbers corresponding to the one or more dual-tone multi-frequency signals. For example, the assistant server 502 may receive a representation of the utterance "OK Computer, press one," determine from a transcription that "Press one" indicates to generate DTMF signals for a number represented by "one" in the transcription, and, in response, provide an instruction to the speech-enabled device 125 instructing the speech-enabled device 125 to instruct the voice server 506 to generate DTMF for "1." Additionally or alternatively, in some implementations the speech-enabled device 125 may generate the DTMF. For example, the speech-enabled device 125 may receive an instruction from the assistant server 502 to generate DTMF for "1" and, in response, produce DTMF tones for "1" and send those tones to the voice server 506.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Different configurations of the system 100 may be used where functionality of the speech-enabled device 125, the assistant server 502, and the voice server 506 may be combined, further separated, distributed, or interchanged. For example, instead of including an audio representation of the utterance in the query for the assistant server 502 to transcribe, the speech-enabled device 125 may transcribe an utterance and include the transcription in the query to the assistant server 502.

Figure 9:
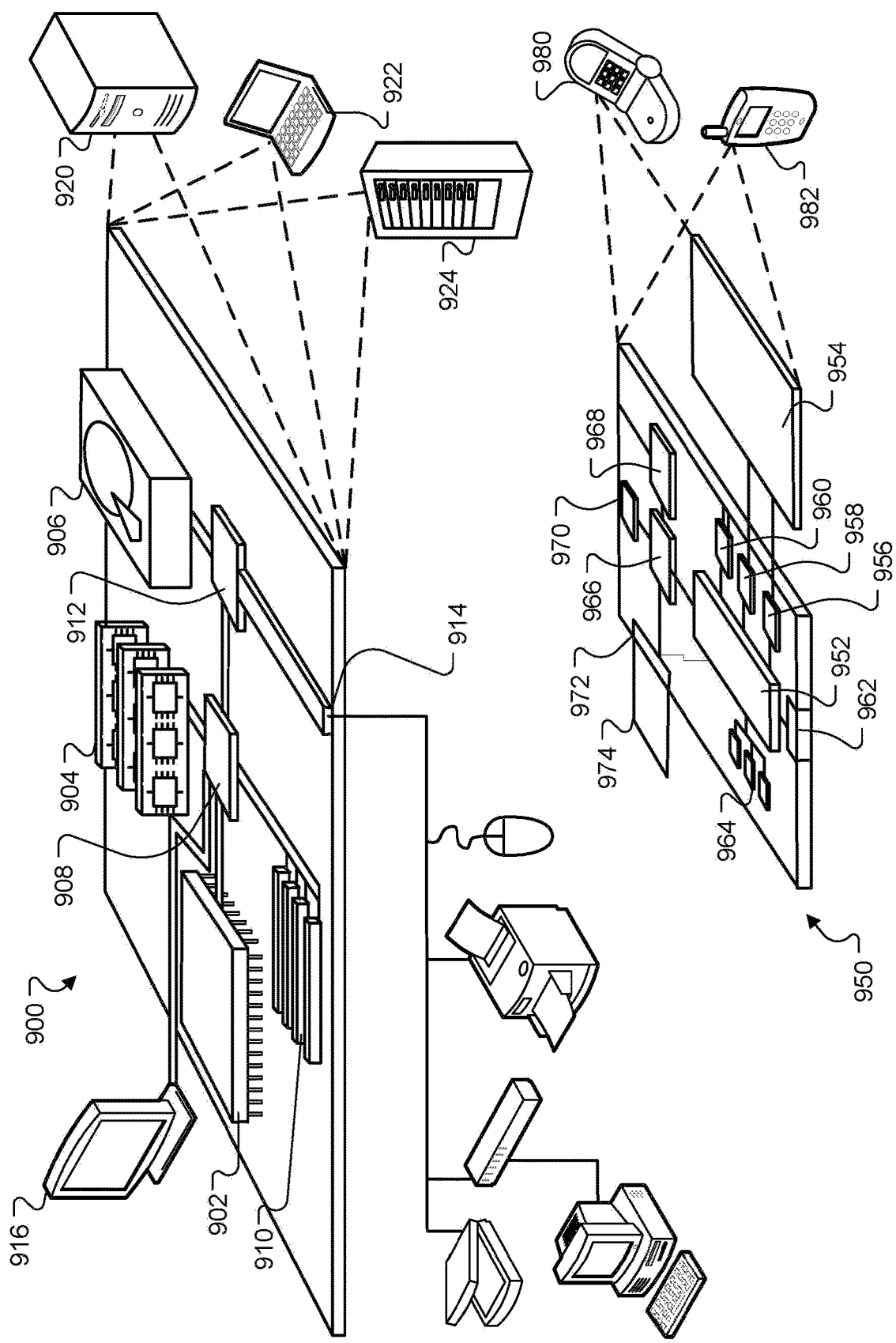
FIG. 9 is a diagram of examples of computing devices.

FIG. 9 shows an example of a computing device 900 and a mobile computing device 950 that can be used to implement the techniques described here. The computing device 900 is intended to represent various forms of digital computers, such as laptops, desktops, workstations, personal digital assistants, servers, blade servers, mainframes, and other appropriate computers. The mobile computing device 950 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 900 includes a processor 902, a memory 904, a storage device 906, a high-speed interface 908 connecting to the memory 904 and multiple high-speed expansion ports 910, and a low-speed interface 912 connecting to a low-speed expansion port 914 and the storage device 906. Each of the processor 902, the memory 904, the storage device 906, the high-speed interface 908, the high-speed expansion ports 910, and the low-speed interface 912, are interconnected using various busses, and may be mounted on a common motherboard or in other manners as appropriate. The processor 902 can process instructions for execution within the computing device 900, including instructions stored in the memory 904 or on the storage device 906 to display graphical information for a graphical user interface (GUI) on an external input/output device, such as a display 916 coupled to the high-speed interface 908. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 904 stores information within the computing device 900. In some implementations, the memory 904 is a volatile memory unit or units. In some implementations, the memory 904 is a non-volatile memory unit or units. The memory 904 may also be another form of computer-readable medium, such as a magnetic or optical disk.

The storage device 906 is capable of providing mass storage for the computing device 900. In some implementations, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 902), perform one or more methods, such as those described above. The instructions can also be stored by one or more storage devices such as computer- or machine-readable mediums (for example, the memory 904, the storage device 906, or memory on the processor 902).

The high-speed interface 908 manages bandwidth-intensive operations for the computing device 900, while the low-speed interface 912 manages lower bandwidth-intensive operations. Such allocation of functions is an example only. In some implementations, the high-speed interface 908 is coupled to the memory 904, the display 916 (e.g., through a graphics processor or accelerator), and to the high-speed expansion ports 910, which may accept various expansion cards (not shown). In the implementation, the low-speed interface 912 is coupled to the storage device 906 and the low-speed expansion port 914. The low-speed expansion port 914, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. In addition, it may be implemented in a personal computer such as a laptop computer 922. It may also be implemented as part of a rack server system 924. Alternatively, components from the computing device 900 may be combined with other components in a mobile device (not shown), such as a mobile computing device 950. Each of such devices may contain one or more of the computing device 900 and the mobile computing device 950, and an entire system may be made up of multiple computing devices communicating with each other.

The mobile computing device 950 includes a processor 952, a memory 964, an input/output device such as a display 954, a communication interface 966, and a transceiver 968, among other components. The mobile computing device 950 may also be provided with a storage device, such as a micro-drive or other device, to provide additional storage. Each of the processor 952, the memory 964, the display 954, the communication interface 966, and the transceiver 968, are interconnected using various buses, and several of the components may be mounted on a common motherboard or in other manners as appropriate.

The processor 952 can execute instructions within the mobile computing device 950, including instructions stored in the memory 964. The processor 952 may be implemented as a chipset of chips that include separate and multiple analog and digital processors. The processor 952 may provide, for example, for coordination of the other components of the mobile computing device 950, such as control of user interfaces, applications run by the mobile computing device 950, and wireless communication by the mobile computing device 950.

The processor 952 may communicate with a user through a control interface 958 and a display interface 956 coupled to the display 954. The display 954 may be, for example, a TFT (Thin-Film-Transistor Liquid Crystal Display) display or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may provide communication with the processor 952, so as to enable near area communication of the mobile computing device 950 with other devices. The external interface 962 may provide, for example, for wired communication in some implementations, or for wireless communication in other implementations, and multiple interfaces may also be used.

The memory 964 stores information within the mobile computing device 950. The memory 964 can be implemented as one or more of a computer-readable medium or media, a volatile memory unit or units, or a non-volatile memory unit or units. An expansion memory 974 may also be provided and connected to the mobile computing device 950 through an expansion interface 972, which may include, for example, a SIMM (Single In Line Memory Module) card interface. The expansion memory 974 may provide extra storage space for the mobile computing device 950, or may also store applications or other information for the mobile computing device 950. Specifically, the expansion memory 974 may include instructions to carry out or supplement the processes described above, and may include secure information also. Thus, for example, the expansion memory 974 may be provided as a security module for the mobile computing device 950, and may be programmed with instructions that permit secure use of the mobile computing device 950. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier that the instructions, when executed by one or more processing devices (for example, processor 952), perform one or more methods, such as those described above. The instructions can also be stored by one or more storage devices, such as one or more computer- or machine-readable mediums (for example, the memory 964, the expansion memory 974, or memory on the processor 952). In some implementations, the instructions can be received in a propagated signal, for example, over the transceiver 968 or the external interface 962.

The mobile computing device 950 may communicate wirelessly through the communication interface 966, which may include digital signal processing circuitry where necessary. The communication interface 966 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 968 using a radio-frequency. In addition, short-range communication may occur, such as using a Bluetooth, WiFi, or other such transceiver (not shown). In addition, a GPS (Global Positioning System) receiver module 970 may provide additional navigation- and location-related wireless data to the mobile computing device 950, which may be used as appropriate by applications running on the mobile computing device 950.

The mobile computing device 950 may also communicate audibly using an audio codec 960, which may receive spoken information from a user and convert it to usable digital information. The audio codec 960 may likewise generate audible sound for a user, such as through a speaker, e.g., in a handset of the mobile computing device 950. Such sound may include sound from voice telephone calls, may include recorded sound (e.g., voice messages, music files, etc.) and may also include sound generated by applications operating on the mobile computing device 950.

The mobile computing device 950 may be implemented in a number of different forms, as shown in the figure. For example, it may be implemented as a cellular telephone 980. It may also be implemented as part of a smart-phone 982, personal digital assistant, or other similar mobile device.

Various implementations of the systems and techniques described here can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used herein, the terms "machine-readable medium" "computer-readable medium" refers to any computer program product, apparatus and/or device, e.g., magnetic discs, optical disks, memory, Programmable Logic devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component such as an application server, or that includes a front end component such as a client computer having a graphical user interface or a Web browser through which a user can interact with an implementation of the systems and techniques described here, or any combination of such back end, middleware, or front end components. The components of the system can be interconnected by any form or medium of digital data communication such as, a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, in some embodiments, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

A number of embodiments have been described. Nevertheless, it will be understood that various modifications may be made without departing from the scope of the invention. For example, various forms of the flows shown above may be used, with steps re-ordered, added, or removed. Also, although several applications of the systems and methods have been described, it should be recognized that numerous other applications are contemplated. Accordingly, other embodiments are within the scope of the following claims.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method implemented by one or more processors of a digital assistant device, the method comprising:

receiving, from a call-placing user associated with the digital assistant device, an utterance that requests that a digital assistant initiate a voice call with a callee and on behalf of the call-placing user, the digital assistant executing at least in part at the digital assistant device;

determining, based on processing the utterance, a recipient voice number to call based on the callee user that is identified by the utterance;

in response to receiving the utterance, initiating the voice call to the recipient voice number and on behalf of the call-placing user to enable the call-placing user to engage in a conversation with the callee during the voice call; and during the voice call:
receiving, from the call-placing user, an additional utterance that requests that the digital assistant terminates the voice call with the callee and on behalf of the call-placing user;
determining, based on processing the additional utterance, to terminate the voice call with the callee and on behalf of the call-placing user; and
in response to receiving the additional utterance, terminating the voice call with the callee and on behalf of the call-placing user.

2. The method of claim 1, wherein determining to terminate the voice call with the callee and on behalf of the call-placing user based on processing the additional utterance comprises:
determining that the additional utterance includes a hotword that invokes the digital assistant and that the additional utterance includes a command to terminate the voice call with the callee and on behalf of the call-placing user.

3. The method of claim 1, during the voice call, further comprising:
prior to receiving the additional utterance that requests that the digital assistant terminates the voice call with the callee and on behalf of the call-placing user:
receiving, from the call-placing user, a further additional utterance that requests that the digital assistant perform an action and on behalf of the call-placing user; and
determining, based on processing the further additional utterance, to refrain from performing the action and on behalf of the call-placing user.

4. The method of claim 3, wherein the action is associated with a command to: playback music, playback news, playback a podcast, playback a daily brief, interact with a third party, initiate an additional phone call, or initiate a game.

5. The method of claim 3, during the voice call, further comprising:
in response to determining to refrain from performing the action and on behalf of the call-placing user, providing, for output to the calling-user via the digital assistant device, an indication that the action cannot be performed during the voice call.

6. The method of claim 1, during the voice call, further comprising:
prior to receiving the additional utterance that requests that the digital assistant terminates the voice call with the callee and on behalf of the call-placing user:
receiving, from the call-placing user, a further additional utterance that requests that the digital assistant perform an action and on behalf of the call-placing user; and
determining, based on processing the further additional utterance, to perform the action and on behalf of the call-placing user.

7. The method of claim 3, wherein the action is associated with a command to: increase a volume of the digital assistant device, playback weather information, playback time information.

8. The method of claim 1, wherein the additional utterance is audibly perceptible to the callee during the voice call.

9. The method of claim 1, in response to receiving the additional utterance, further comprising:
providing, for audible output to the calling-user via the digital assistant device, a verbal audio cue that the voice call has been terminated.

10. The method of claim 1, in response to receiving the additional utterance, further comprising:
providing, for audible output to the calling-user via the digital assistant device, a non-verbal audio cue that the voice call has been terminated.

11. The method of claim 1, wherein determining the recipient voice number to call based on the callee user that is identified by the utterance and based on processing the spoken utterance comprises:
identifying, based on at least the utterance, a contact entry, from among a plurality of contact entries, for the callee; and
determining a voice number associated with the contact entry for the callee as the recipient voice number.

12. A digital assistant device comprising:
at least one hardware processor; and
memory storing instructions that, when executed by the at least one hardware processor, cause the at least one hardware processor to:
receive, from a call-placing user associated with the digital assistant device, an utterance that requests that a digital assistant initiate a voice call with a callee and on behalf of the call-placing user, the digital assistant executing at least in part at the digital assistant device;
determine, based on processing the utterance, a recipient voice number to call based on the callee user that is identified by the utterance;
in response to receiving the utterance, initiate the voice call to the recipient voice number and on behalf of the call-placing user to enable the call-placing user to engage in a conversation with the callee during the voice call; and
during the voice call:
receive, from the call-placing user, an additional utterance that requests that the digital assistant terminates the voice call with the callee and on behalf of the call-placing user;
determine, based on processing the additional utterance, to terminate the voice call with the callee and on behalf of the call-placing user; and
in response to receiving the additional utterance, terminate the voice call with the callee and on behalf of the call-placing user.

13. The digital assistant device of claim 12, wherein the instructions to determine to terminate the voice call with the callee and on behalf of the call-placing user based on processing the additional utterance comprise instructions to:
  determine that the additional utterance includes a hotword that invokes the digital assistant and that the additional utterance includes a command to terminate the voice call with the callee and on behalf of the call-placing user.

14. The digital assistant device of claim 12, during the voice call, wherein the instructions further cause the at least one hardware processor to:
  prior to receiving the additional utterance that requests that the digital assistant terminates the voice call with the callee and on behalf of the call-placing user:
    receive, from the call-placing user, a further additional utterance that requests that the digital assistant perform an action and on behalf of the call-placing user, wherein the action is associated with a command to: playback music, playback news, playback a podcast, playback a daily brief, interact with a third party, initiate an additional phone call, or initiate a game; and
    determine, based on processing the further additional utterance, to refrain from performing the action and on behalf of the call-placing user.

15. The digital assistant device of claim 14, during the voice call, wherein the instructions further cause the at least one hardware processor to:
  in response to determining to refrain from performing the action and on behalf of the call-placing user, provide, for output to the calling-user via the digital assistant device, an indication that the action cannot be performed during the voice call.

16. The digital assistant device of claim 12, during the voice call, wherein the instructions further cause the at least one hardware processor to:
  prior to receiving the additional utterance that requests that the digital assistant terminates the voice call with the callee and on behalf of the call-placing user:
    receive, from the call-placing user, a further additional utterance that requests that the digital assistant perform an action and on behalf of the call-placing user, wherein the action is associated with a command to: increase a volume of the digital assistant device, playback weather information, playback time information; and
    determine, based on processing the further additional utterance, to perform the action and on behalf of the call-placing user.

17. The digital assistant device of claim 12, wherein the additional utterance is audibly perceptible to the callee during the voice call.

18. The digital assistant device of claim 12, in response to receiving the additional utterance, wherein the instructions further cause the at least one hardware processor to:
  provide, for audible output to the calling-user via the digital assistant device, a verbal audio cue that the voice call has been terminated; or
  provide, for audible output to the calling-user via the digital assistant device, a non-verbal audio cue that the voice call has been terminated.

19. The digital assistant device of claim 12, wherein the instructions to determine the recipient voice number to call based on the callee user that is identified by the utterance and based on processing the spoken utterance comprise instructions to:
  identify, based on at least the utterance, a contact entry, from among a plurality of contact entries, for the callee; and
  determine a voice number associated with the contact entry for the callee as the recipient voice number.

20. A non-transitory computer-readable storage medium storing instructions that, when executed, cause at least one processor to perform operations, the operations comprising:
  receiving, from a call-placing user associated with the digital assistant device, an utterance that requests that a digital assistant initiate a voice call with a callee and on behalf of the call-placing user, the digital assistant executing at least in part at the digital assistant device;
  determining, based on processing the utterance, a recipient voice number to call based on the callee user that is identified by the utterance;
  in response to receiving the utterance, initiating the voice call to the recipient voice number and on behalf of the call-placing user to enable the call-placing user to engage in a conversation with the callee during the voice call; and
  during the voice call:
    receiving, from the call-placing user, an additional utterance that requests that the digital assistant terminates the voice call with the callee and on behalf of the call-placing user;
    determining, based on processing the additional utterance, to terminate the voice call with the callee and on behalf of the call-placing user; and
    in response to receiving the additional utterance, terminating the voice call with the callee and on behalf of the call-placing user.

* * * * *